United States Patent
Maes

(10) Patent No.: US 8,675,852 B2
(45) Date of Patent: Mar. 18, 2014

(54) USING LOCATION AS A PRESENCE ATTRIBUTE

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1143 days.

(21) Appl. No.: 12/014,387

(22) Filed: Jan. 15, 2008

(65) Prior Publication Data
US 2008/0235230 A1    Sep. 25, 2008

Related U.S. Application Data

(60) Provisional application No. 60/896,676, filed on Mar. 23, 2007.

(51) Int. Cl.
  H04M 3/42    (2006.01)
  H04M 3/493    (2006.01)
  H04W 24/00    (2009.01)

(52) U.S. Cl.
  USPC .............. 379/201.1; 379/201.01; 379/201.02; 455/414.1; 455/414.2; 455/456.1; 455/456.3

(58) Field of Classification Search
  USPC ................. 379/201.1, 142.1, 201.01, 201.06; 455/404.2, 414.1, 414.2, 456.1, 456.2, 455/456.3
  See application file for complete search history.

(56) References Cited

U.S. PATENT DOCUMENTS

| | | | |
|---|---|---|---|
| 5,414,812 A | 5/1995 | Filip et al. | |
| 5,613,060 A | 3/1997 | Britton et al. | |
| 5,699,513 A | 12/1997 | Feigen et al. | |
| 5,737,321 A | 4/1998 | Takahashi | |
| 5,786,770 A | 7/1998 | Thompson | |
| 5,850,517 A | 12/1998 | Verkler et al. | |
| 5,867,665 A | 2/1999 | Butman et al. | |
| 5,946,634 A | 8/1999 | Korpela | |
| 6,115,690 A | 9/2000 | Wong | |
| 6,119,104 A | 9/2000 | Brumbelow | |
| 6,128,645 A | 10/2000 | Butman et al. | |

(Continued)

FOREIGN PATENT DOCUMENTS

| | | |
|---|---|---|
| EP | 2 034 748 A1 | 3/2009 |
| WO | WO 2007134468 A1 | 11/2007 |

OTHER PUBLICATIONS

U.S. Appl. No. 11/848,347, filed Aug. 31, 2007, Office Action mailed Oct. 29, 2009, 12 pages.

(Continued)

*Primary Examiner* — Khai N Nguyen
(74) *Attorney, Agent, or Firm* — Kilpatrick Townsend & Stockton LLP

(57) ABSTRACT

Embodiments of the invention provide systems and methods for determining location of a principal. According to one embodiment, a method of providing location information for a principal can comprise receiving a presence event related to the principal. A location of the principal can be indicated by or determined based on the presence event. The location of the principal can be stored as a location attribute of a presence profile of the principal. The method can further comprise providing access to the location attribute of the presence profile of the principal to one or more subscribers or users of a presence service. In some cases, providing access to the location attribute of the presence profile of the principal to the one or more subscribers can be based on one or more policies of the presence service.

53 Claims, 8 Drawing Sheets

(56) References Cited

U.S. PATENT DOCUMENTS

| | | |
|---|---|---|
| 6,157,941 A | 12/2000 | Verkler et al. |
| 6,163,800 A | 12/2000 | Ejiri |
| 6,192,231 B1 | 2/2001 | Chapman et al. |
| 6,192,414 B1 | 2/2001 | Horn |
| 6,230,271 B1 | 5/2001 | Wadlow et al. |
| 6,272,556 B1 | 8/2001 | Gish |
| 6,275,857 B1 | 8/2001 | McCartney |
| 6,336,138 B1 | 1/2002 | Caswell et al. |
| 6,374,305 B1 | 4/2002 | Gupta et al. |
| 6,466,984 B1 | 10/2002 | Naveh et al. |
| 6,496,864 B1 | 12/2002 | McCartney |
| 6,553,108 B1 | 4/2003 | Felger |
| 6,578,159 B1 | 6/2003 | Kitagawa et al. |
| 6,611,812 B2 | 8/2003 | Hurtado et al. |
| 6,633,560 B1 | 10/2003 | Albert et al. |
| 6,748,570 B1 | 6/2004 | Bahrs et al. |
| 6,792,605 B1 | 9/2004 | Roberts et al. |
| 6,813,278 B1 | 11/2004 | Swartz et al. |
| 6,868,413 B1 | 3/2005 | Grindrod et al. |
| 6,965,902 B1 | 11/2005 | Ghatate |
| 6,978,348 B2 | 12/2005 | Belknap et al. |
| 6,981,023 B1 | 12/2005 | Hamilton et al. |
| 6,985,939 B2 | 1/2006 | Fletcher et al. |
| 7,003,578 B2 | 2/2006 | Kanada et al. |
| 7,042,988 B2 | 5/2006 | Juitt et al. |
| 7,043,538 B2 | 5/2006 | Guedalia et al. |
| 7,072,653 B1 | 7/2006 | Sladek et al. |
| 7,073,055 B1 | 7/2006 | Freed et al. |
| 7,089,317 B2 | 8/2006 | Jeyaraman et al. |
| 7,106,848 B1 | 9/2006 | Barlow et al. |
| 7,111,060 B2 | 9/2006 | Araujo et al. |
| 7,114,146 B2 | 9/2006 | Zhang et al. |
| 7,114,148 B2 | 9/2006 | Irving et al. |
| 7,133,669 B2 | 11/2006 | Nair et al. |
| 7,143,094 B2 | 11/2006 | Arroyo et al. |
| 7,146,616 B2 | 12/2006 | Dorner et al. |
| 7,185,342 B1 | 2/2007 | Carrer et al. |
| 7,194,482 B2 | 3/2007 | Larkin et al. |
| 7,222,148 B2 | 5/2007 | Potter et al. |
| 7,222,334 B2 | 5/2007 | Casati et al. |
| 7,272,625 B1 | 9/2007 | Hannel et al. |
| 7,281,029 B2 | 10/2007 | Rawat |
| 7,295,532 B2 | 11/2007 | Haller et al. |
| 7,302,570 B2 | 11/2007 | Beard et al. |
| 7,340,508 B1 | 3/2008 | Kasi et al. |
| 7,409,707 B2 | 8/2008 | Swander et al. |
| 7,411,943 B2 | 8/2008 | Kittredge et al. |
| 7,415,010 B1 | 8/2008 | Croak et al. |
| 7,426,381 B2 | 9/2008 | Maes |
| 7,433,838 B2 | 10/2008 | Welsh et al. |
| 7,443,972 B1 | 10/2008 | Barlow et al. |
| 7,444,620 B2 | 10/2008 | Marvin |
| 7,447,793 B2 | 11/2008 | Morioka |
| 7,448,022 B1 | 11/2008 | Ram et al. |
| 7,454,399 B2 | 11/2008 | Matichuk |
| 7,461,062 B2 | 12/2008 | Stewart et al. |
| 7,472,349 B1 | 12/2008 | Srivastava et al. |
| 7,519,076 B2 | 4/2009 | Janssen et al. |
| 7,580,994 B1 | 8/2009 | Fiszman et al. |
| 7,617,521 B2 | 11/2009 | Maes |
| 7,630,953 B2 | 12/2009 | Stauber et al. |
| 7,660,297 B2 | 2/2010 | Fisher et al. |
| 7,676,813 B2 | 3/2010 | Bisset et al. |
| 7,702,792 B2 | 4/2010 | Shaffer et al. |
| 7,716,310 B2 | 5/2010 | Foti |
| 7,720,926 B2 | 5/2010 | Asahara |
| 7,752,634 B1 | 7/2010 | Saxena et al. |
| 7,779,445 B2 | 8/2010 | Ellis |
| 7,853,647 B2 | 12/2010 | Maes |
| 7,860,490 B2 | 12/2010 | Maes |
| 7,865,607 B2 | 1/2011 | Sonalkar et al. |
| 7,873,716 B2 | 1/2011 | Maes |
| 7,925,727 B2 | 4/2011 | Sullivan et al. |
| 7,933,397 B2 | 4/2011 | Jain |
| 8,023,971 B2 | 9/2011 | Egli |
| 8,032,920 B2 | 10/2011 | Maes |
| 8,036,362 B1 | 10/2011 | Skinner |
| 8,060,067 B2 | 11/2011 | Tarleton et al. |
| 8,068,860 B1 | 11/2011 | Midkiff |
| 8,073,810 B2 | 12/2011 | Maes |
| 8,090,848 B2 | 1/2012 | Maes |
| 8,114,555 B2 | 2/2012 | Leonida et al. |
| 8,121,278 B2 | 2/2012 | Leigh et al. |
| 8,161,171 B2 | 4/2012 | Maes |
| 8,214,503 B2 | 7/2012 | Maes |
| 8,223,951 B1 | 7/2012 | Edelhaus et al. |
| 8,230,449 B2 | 7/2012 | Maes |
| 8,255,470 B2 | 8/2012 | Jackson et al. |
| 2001/0010053 A1 | 7/2001 | Ben-Shachar et al. |
| 2001/0016880 A1 | 8/2001 | Cai et al. |
| 2001/0028649 A1 | 10/2001 | Pogossiants et al. |
| 2002/0002684 A1 | 1/2002 | Fox et al. |
| 2002/0087674 A1 | 7/2002 | Guilford et al. |
| 2002/0099738 A1 | 7/2002 | Grant |
| 2002/0101879 A1 | 8/2002 | Bouret |
| 2002/0104015 A1 | 8/2002 | Barzilai et al. |
| 2002/0111848 A1 | 8/2002 | White |
| 2002/0120729 A1 | 8/2002 | Faccin et al. |
| 2002/0143819 A1 | 10/2002 | Han et al. |
| 2002/0144119 A1 | 10/2002 | Benatar |
| 2002/0178122 A1 | 11/2002 | Maes |
| 2002/0184373 A1 | 12/2002 | Maes |
| 2002/0191774 A1 | 12/2002 | Creamer et al. |
| 2002/0194388 A1 | 12/2002 | Boloker et al. |
| 2002/0198719 A1 | 12/2002 | Gergic et al. |
| 2002/0198991 A1 | 12/2002 | Gopalakrishnan et al. |
| 2003/0003953 A1 | 1/2003 | Houplain |
| 2003/0004746 A1 | 1/2003 | Kheirolomoom et al. |
| 2003/0005034 A1 | 1/2003 | Amin |
| 2003/0023953 A1 | 1/2003 | Lucassen et al. |
| 2003/0046316 A1 | 3/2003 | Gergic et al. |
| 2003/0061268 A1 | 3/2003 | Moerdijk et al. |
| 2003/0061404 A1 | 3/2003 | Atwal et al. |
| 2003/0115203 A1 | 6/2003 | Brown et al. |
| 2003/0115260 A1 | 6/2003 | Edge |
| 2003/0118167 A1 | 6/2003 | Sammon et al. |
| 2003/0120502 A1 | 6/2003 | Robb et al. |
| 2003/0131076 A1 | 7/2003 | Nelson et al. |
| 2003/0135553 A1 | 7/2003 | Pendakur |
| 2003/0140115 A1 | 7/2003 | Mehra |
| 2003/0140131 A1 | 7/2003 | Chandrashekhar et al. |
| 2003/0154233 A1 | 8/2003 | Patterson |
| 2003/0185233 A1 | 10/2003 | Ji et al. |
| 2003/0191769 A1 | 10/2003 | Crisan et al. |
| 2003/0191823 A1 | 10/2003 | Bansal et al. |
| 2003/0208539 A1 | 11/2003 | Gildenblat et al. |
| 2003/0217044 A1 | 11/2003 | Zhang et al. |
| 2003/0229760 A1 | 12/2003 | Doyle et al. |
| 2003/0229812 A1 | 12/2003 | Buchholz |
| 2004/0015547 A1 | 1/2004 | Griffin et al. |
| 2004/0015578 A1 | 1/2004 | Karakashian et al. |
| 2004/0024720 A1 | 2/2004 | Fairweather |
| 2004/0064528 A1 | 4/2004 | Meredith et al. |
| 2004/0068586 A1 | 4/2004 | Xie et al. |
| 2004/0093593 A1 | 5/2004 | Jhanwar et al. |
| 2004/0100923 A1 | 5/2004 | Yam |
| 2004/0110493 A1 | 6/2004 | Alvarez et al. |
| 2004/0125758 A1 | 7/2004 | Hayduk |
| 2004/0128546 A1 | 7/2004 | Blakley et al. |
| 2004/0133627 A1 | 7/2004 | Kalyanaraman et al. |
| 2004/0139319 A1 | 7/2004 | Favazza et al. |
| 2004/0148334 A1 | 7/2004 | Arellano et al. |
| 2004/0153545 A1 | 8/2004 | Pandaya et al. |
| 2004/0161090 A1 | 8/2004 | Digate et al. |
| 2004/0162881 A1 | 8/2004 | Digate et al. |
| 2004/0176988 A1 | 9/2004 | Boughannam |
| 2004/0221005 A1 | 11/2004 | Albaugh et al. |
| 2005/0015340 A1 | 1/2005 | Maes |
| 2005/0021670 A1 | 1/2005 | Maes |
| 2005/0050194 A1 | 3/2005 | Honeisen et al. |
| 2005/0054287 A1 | 3/2005 | Kim |
| 2005/0068167 A1 | 3/2005 | Boyer et al. |
| 2005/0073982 A1 | 4/2005 | Corneille et al. |
| 2005/0075115 A1 | 4/2005 | Corneille et al. |

(56) References Cited

U.S. PATENT DOCUMENTS

| | | |
|---|---|---|
| 2005/0086197 A1 | 4/2005 | Boubez et al. |
| 2005/0086297 A1 | 4/2005 | Hinks |
| 2005/0091156 A1 | 4/2005 | Hailwood et al. |
| 2005/0125696 A1 | 6/2005 | Afshar et al. |
| 2005/0132086 A1 | 6/2005 | Flurry et al. |
| 2005/0141691 A1 | 6/2005 | Wengrovitz |
| 2005/0144557 A1 | 6/2005 | Li et al. |
| 2005/0172027 A1 | 8/2005 | Castellanos et al. |
| 2005/0193269 A1 | 9/2005 | Haswell et al. |
| 2005/0228984 A1 | 10/2005 | Edery et al. |
| 2005/0239485 A1 | 10/2005 | Kundu et al. |
| 2005/0249190 A1 | 11/2005 | Birch |
| 2005/0249344 A1 | 11/2005 | Mueller et al. |
| 2005/0267979 A1 | 12/2005 | Bailey |
| 2006/0014688 A1 | 1/2006 | Costa et al. |
| 2006/0021010 A1 | 1/2006 | Atkins et al. |
| 2006/0031559 A1 | 2/2006 | Sorokopud et al. |
| 2006/0036689 A1 | 2/2006 | Buford et al. |
| 2006/0041669 A1 | 2/2006 | Bemmel et al. |
| 2006/0053227 A1 | 3/2006 | Ye et al. |
| 2006/0072474 A1 | 4/2006 | Mitchell |
| 2006/0080117 A1 | 4/2006 | Carr et al. |
| 2006/0104306 A1 | 5/2006 | Adamczyk et al. |
| 2006/0104431 A1 | 5/2006 | Emery et al. |
| 2006/0112400 A1 | 5/2006 | Zhang et al. |
| 2006/0116912 A1 | 6/2006 | Maes |
| 2006/0117109 A1 | 6/2006 | Maes |
| 2006/0143686 A1 | 6/2006 | Maes |
| 2006/0164902 A1 | 7/2006 | Fung |
| 2006/0165060 A1 | 7/2006 | Dua |
| 2006/0178898 A1 | 8/2006 | Habibi |
| 2006/0190600 A1 | 8/2006 | Blohm et al. |
| 2006/0210033 A1 * | 9/2006 | Grech et al. ............... 379/88.19 |
| 2006/0212574 A1 | 9/2006 | Maes |
| 2006/0229078 A1 | 10/2006 | Itzkovitz et al. |
| 2006/0256774 A1 | 11/2006 | Rigaldies et al. |
| 2006/0272028 A1 | 11/2006 | Maes |
| 2006/0282856 A1 | 12/2006 | Errico et al. |
| 2006/0291507 A1 | 12/2006 | Sarosi et al. |
| 2007/0005770 A1 | 1/2007 | Kramer et al. |
| 2007/0011191 A1 | 1/2007 | Otokawa et al. |
| 2007/0011322 A1 | 1/2007 | Moiso |
| 2007/0027975 A1 | 2/2007 | Tai et al. |
| 2007/0047534 A1 | 3/2007 | Hakusui |
| 2007/0061397 A1 | 3/2007 | Gregorat et al. |
| 2007/0071224 A1 | 3/2007 | Shtivelman et al. |
| 2007/0088836 A1 | 4/2007 | Tai et al. |
| 2007/0099613 A1 | 5/2007 | Burgan et al. |
| 2007/0100831 A1 | 5/2007 | Cox |
| 2007/0100981 A1 * | 5/2007 | Adamczyk et al. ........... 709/223 |
| 2007/0112574 A1 | 5/2007 | Greene |
| 2007/0117556 A1 | 5/2007 | Rogalski |
| 2007/0118618 A1 | 5/2007 | Kisel et al. |
| 2007/0118648 A1 | 5/2007 | Millefiorini et al. |
| 2007/0118662 A1 | 5/2007 | Vishwanathan et al. |
| 2007/0121539 A1 | 5/2007 | Kikuchi |
| 2007/0150480 A1 | 6/2007 | Hwang et al. |
| 2007/0150936 A1 | 6/2007 | Maes |
| 2007/0182541 A1 * | 8/2007 | Harris et al. ................. 340/506 |
| 2007/0189466 A1 | 8/2007 | Croak et al. |
| 2007/0192374 A1 | 8/2007 | Abnous et al. |
| 2007/0192465 A1 | 8/2007 | Modarressi |
| 2007/0197227 A1 | 8/2007 | Naqvi et al. |
| 2007/0201376 A1 | 8/2007 | Marshall-Wilson |
| 2007/0203841 A1 | 8/2007 | Maes |
| 2007/0204017 A1 | 8/2007 | Maes |
| 2007/0223462 A1 | 9/2007 | Hite et al. |
| 2007/0223671 A1 | 9/2007 | Lee |
| 2007/0233883 A1 | 10/2007 | De Lutiis et al. |
| 2007/0239866 A1 | 10/2007 | Cox et al. |
| 2007/0271554 A1 | 11/2007 | Fletcher et al. |
| 2007/0276907 A1 | 11/2007 | Maes |
| 2007/0280226 A1 | 12/2007 | Sonalkar et al. |
| 2007/0291859 A1 | 12/2007 | Maes |
| 2008/0013533 A1 | 1/2008 | Bogineni et al. |
| 2008/0025243 A1 | 1/2008 | Corneille et al. |
| 2008/0037747 A1 | 2/2008 | Tucker |
| 2008/0043975 A1 | 2/2008 | Miloslavsky et al. |
| 2008/0049929 A1 | 2/2008 | Miloslavsky et al. |
| 2008/0080479 A1 | 4/2008 | Maes |
| 2008/0095326 A1 | 4/2008 | Qi et al. |
| 2008/0109853 A1 | 5/2008 | Einarsson et al. |
| 2008/0126541 A1 | 5/2008 | Rosenberg et al. |
| 2008/0127232 A1 | 5/2008 | Langen et al. |
| 2008/0147799 A1 | 6/2008 | Morris |
| 2008/0151768 A1 | 6/2008 | Liu |
| 2008/0151918 A1 | 6/2008 | Foti |
| 2008/0162637 A1 | 7/2008 | Adamczyk et al. |
| 2008/0168523 A1 | 7/2008 | Ansari et al. |
| 2008/0175251 A1 | 7/2008 | Oouchi et al. |
| 2008/0175357 A1 | 7/2008 | Tucker |
| 2008/0186845 A1 | 8/2008 | Maes |
| 2008/0189401 A1 | 8/2008 | Maes |
| 2008/0201705 A1 | 8/2008 | Wookey |
| 2008/0212762 A1 | 9/2008 | Gray et al. |
| 2008/0222694 A1 | 9/2008 | Nakae |
| 2008/0228919 A1 | 9/2008 | Doshi et al. |
| 2008/0232567 A1 | 9/2008 | Maes |
| 2008/0235327 A1 | 9/2008 | Maes et al. |
| 2008/0235354 A1 | 9/2008 | Maes |
| 2008/0235380 A1 | 9/2008 | Maes |
| 2008/0253543 A1 | 10/2008 | Aharon |
| 2008/0275883 A1 | 11/2008 | Ashraf et al. |
| 2008/0281607 A1 | 11/2008 | Sajja et al. |
| 2008/0288966 A1 | 11/2008 | Maes |
| 2008/0301135 A1 | 12/2008 | Alves et al. |
| 2008/0307108 A1 | 12/2008 | Yan et al. |
| 2009/0003362 A1 | 1/2009 | Pattabhiraman et al. |
| 2009/0006360 A1 | 1/2009 | Liao et al. |
| 2009/0015433 A1 | 1/2009 | James et al. |
| 2009/0022072 A1 | 1/2009 | Zhu et al. |
| 2009/0022286 A1 | 1/2009 | Brunson et al. |
| 2009/0034426 A1 | 2/2009 | Luft et al. |
| 2009/0086950 A1 | 4/2009 | Vendrow et al. |
| 2009/0093240 A1 | 4/2009 | Lang |
| 2009/0106677 A1 | 4/2009 | Son et al. |
| 2009/0109959 A1 | 4/2009 | Elliott et al. |
| 2009/0112875 A1 | 4/2009 | Maes |
| 2009/0119303 A1 | 5/2009 | Rio et al. |
| 2009/0125595 A1 | 5/2009 | Maes |
| 2009/0132717 A1 | 5/2009 | Maes |
| 2009/0154681 A1 | 6/2009 | Kung et al. |
| 2009/0187919 A1 | 7/2009 | Maes |
| 2009/0190603 A1 | 7/2009 | Damola et al. |
| 2009/0193057 A1 | 7/2009 | Maes |
| 2009/0193433 A1 | 7/2009 | Maes |
| 2009/0201917 A1 | 8/2009 | Maes et al. |
| 2009/0222541 A1 | 9/2009 | Monga et al. |
| 2009/0222858 A1 | 9/2009 | Hjelm et al. |
| 2009/0228584 A1 | 9/2009 | Maes et al. |
| 2009/0306834 A1 | 12/2009 | Hjelm et al. |
| 2009/0328051 A1 | 12/2009 | Maes |
| 2010/0037157 A1 | 2/2010 | Chang et al. |
| 2010/0049640 A1 | 2/2010 | Maes |
| 2010/0049826 A1 | 2/2010 | Maes |
| 2010/0058436 A1 | 3/2010 | Maes |
| 2010/0070447 A1 | 3/2010 | Pfuntner et al. |
| 2010/0077082 A1 | 3/2010 | Hession et al. |
| 2010/0083285 A1 | 4/2010 | Bahat et al. |
| 2010/0091764 A1 | 4/2010 | Merino Gonzalez et al. |
| 2010/0128696 A1 | 5/2010 | Fantini et al. |
| 2010/0153865 A1 | 6/2010 | Barnes et al. |
| 2010/0185772 A1 | 7/2010 | Wang et al. |
| 2010/0192004 A1 | 7/2010 | Bauchot et al. |
| 2010/0281488 A1 | 11/2010 | Krishnamurthy et al. |
| 2011/0035443 A1 | 2/2011 | Jensen |
| 2011/0125909 A1 | 5/2011 | Maes |
| 2011/0125913 A1 | 5/2011 | Maes |
| 2011/0126261 A1 | 5/2011 | Maes |
| 2011/0134804 A1 | 6/2011 | Maes |
| 2011/0142211 A1 | 6/2011 | Maes |
| 2011/0145278 A1 | 6/2011 | Maes |
| 2011/0145347 A1 | 6/2011 | Maes |
| 2011/0182205 A1 | 7/2011 | Gerdes et al. |

(56) References Cited

U.S. PATENT DOCUMENTS

| | | |
|---|---|---|
| 2011/0258619 A1 | 10/2011 | Wookey |
| 2011/0280383 A1 | 11/2011 | Varga et al. |
| 2012/0045040 A1 | 2/2012 | Maes |
| 2012/0047506 A1 | 2/2012 | Maes |
| 2012/0106728 A1 | 5/2012 | Ghaffari et al. |
| 2012/0173745 A1 | 7/2012 | Maes |

OTHER PUBLICATIONS

U.S. Appl. No. 11/951,500, filed Dec. 6, 2007, Office Action mailed Sep. 22, 2009, 24 pages.
U.S. Appl. No. 11/951,500, filed Dec. 6, 2007, Final Office Action mailed Mar. 30, 2010, 26 pages.
U.S. Appl. No. 11/877,129, filed Oct. 23, 2007, Office Action mailed Sep. 28, 2009, 15 pages.
U.S. Appl. No. 11/877,129, filed Oct. 23, 2007, Final Office Action mailed Mar. 29, 2010, 17 pages.
U.S. Appl. No. 11/926,738, filed Oct. 29, 2007, Office Action mailed Feb. 24, 2010, 12 pages.
U.S. Appl. No. 11/943,101, filed Nov. 20, 2007, Office Action mailed Jul. 8, 2009, 9 pages.
U.S. Appl. No. 11/943,101, filed Nov. 20, 2007, Final Office Action mailed Feb. 2, 2010, 9 pages.
U.S. Appl. No. 11/943,101, filed Nov. 20, 2007, Advisory Action mailed Apr. 16, 2010, 3 pages.
U.S. Appl. No. 12/019,299, filed Jan. 24, 2008, Office Action mailed Mar. 31, 2010, 13 pages.
U.S. Appl. No. 11/024,160, filed Dec. 2004, Maes.
Andrews, Tony et al, Business Process Execution Language for Web Services, Version 1.1, BEA Systems, International Business Machines Corporation, SAP AG, Siebel Systems, May 5, 2003, 31 pages.
Liberty Architecture Overview, Liberty Alliance Project Version 1.1, Piscataway New Jersey, Jan. 15, 2003, 44 pages.
Maes, Stephanie, Multi-modal Browser Architecture. Overview on the support of multi-modal browsers in 3GPP, IBM Research Mobile Speech Solutions and Conversational Multi-modal Computing, downloaded http://www.w3.org on May 26, 2003, 25 pages.
Maes, Stephanie, Multi-modal Web IBM Position W3C/WAP Workshop, IBM Research Human Language Technologies, downloaded http://www.w3.org on May 26, 2003, 9 pages.
Parlay APIs 4.0, Parlay X Web Services White Paper, The Parlay Group, Parlay X Working Group, Dec. 16, 2002, 12 pages.
Policy-Based Management Tom Sheldon's Linktionary, downloaded http://www.linktionary.com/policy.html on Aug. 2, 2004, 4 pages.
Seely, Scott, "XML and Web Services Security: Understanding WS-Security", Microsoft Corporation, 2002.
Simpson et al, Java Product Review—Oracle EDA Suite, Dec. 4, 2006, Open Source Magazine, pp. 1-10.
Single Sign on Deployment Guide, Introduction to Single-Sign-On, Netscape 6 Documentation Training Manual http://developer.netscape.com/docs/manuals/security/SSO/sso.htm on May 26, 2003, 5 Pages.
Sundsted, Todd E., with Liberty and single sign-on for all, The Liberty Alliance Project seeks to solve the current online identity crisis Java World, downloaded www.javaworld.com/javaworld/jw-02-2002/jw-0215-liberty.html on May 26, 2003, 7 pages.
Thomas Manes, Anne, "Registering a Web Service in UDDI", 2003.
U.S. Appl. No. 11/848,347, filed Aug. 31, 2007, Final Office Action mailed May 10, 2010, 15 pages.
U.S. Appl. No. 11/877,129, filed Oct. 23, 2007, Advisory Action mailed Jun. 3, 2010, 2 pages.
U.S. Appl. No. 11/926,738, filed Oct. 29, 2007, Final Office Action mailed Jun. 29, 2010, 12 pages.
U.S. Appl. No. 11/951,500, filed Dec. 6, 2007, Advisory Action mailed Jun. 24, 2010, 2 pages.
U.S. Appl. No. 10/855,999, filed May 28, 2004, Office Action dated Jun. 24, 2010, 20 pages.
U.S. Appl. No. 10/855,999, filed May 28, 2004, Advisory Action dated Feb. 16, 2010, 3 pages.
U.S. Appl. No. 10/855,999, filed May 28, 2004, Advisory Action dated Feb. 2, 2009, 3 pages.
U.S. Appl. No. 10/855,999, filed May 28, 2004, Final Office Action dated Nov. 19, 2008, 12 pages.
U.S. Appl. No. 10/855,999, filed May 28, 2004, Final Office Action dated Nov. 23, 2009, 19 pages.
U.S. Appl. No. 10/855,999, filed May 28, 2004, Office Action dated Apr. 15, 2009, 13 pages.
U.S. Appl. No. 10/855,999, filed May 28, 2004, Office Action dated May 1, 2008, 9 pages.
U.S. Appl. No. 11/070,317, filed Mar. 1, 2005, Advisory Action dated May 19, 2009, 3 pages.
U.S. Appl. No. 11/070,317, filed Mar. 1, 2005, Final Office Action dated Feb. 2, 2010, 8 pages.
U.S. Appl. No. 11/070,317, filed Mar. 1, 2005, Final Office Action dated Mar. 4, 2009, 16 pages.
U.S. Appl. No. 11/070,317, filed Mar. 1, 2005, Office Action dated Apr. 30, 2010, 9 pages.
U.S. Appl. No. 11/070,317, filed Mar. 1, 2005, Office Action dated Aug. 18, 2009, 21 pages.
U.S. Appl. No. 11/070,317, filed Mar. 1, 2005, Office Action dated Aug. 5, 2008, 18 pages.
U.S. Appl. No. 11/130,636, filed May 16, 2005, Office Action dated Mar. 23, 2010, 6 pages.
U.S. Appl. No. 11/130,636, filed May 16, 2005, Office Action dated Sep. 18, 2009, 13 pages.
U.S. Appl. No. 12/045,220, filed Mar. 10, 2008, Advisory Action dated Jun. 11, 2010, 3 pages.
U.S. Appl. No. 12/045,220, filed Mar. 10, 2008, Final Office Action dated Apr. 2, 2010, 19 pages.
U.S. Appl. No. 12/045,220, filed Mar. 10, 2008, Office Action dated Oct. 2, 2009, 18 pages.
International Search Report and Written Opinion of PCT/US2010/037074 mailed Jun. 1, 2011, 16 pages.
U.S. Appl. No. 11/848,347, filed Aug. 31, 2007, Advisory Action mailed May 23, 2011, 3 pages.
U.S. Appl. No. 11/926,738, filed Oct. 29, 2007, Advisory Action mailed May 25, 2011, 3 pages.
U.S. Appl. No. 11/943,101, filed Nov. 20, 2007, Advisory Action mailed Apr. 28, 2011, 3 pages.
U.S. Appl. No. 11/951,500, filed Dec. 6, 2007, Final Office Action mailed Apr. 14, 2011, 33 pages.
U.S. Appl. No. 11/024,160, filed Dec. 27, 2004, Final Office Action dated Jun. 1, 2011, 11 pages.
U.S. Appl. No. 12/019,335, filed Jan. 24, 2008, Office Action mailed May 23, 2011, 18 pages.
U.S. Appl. No. No. 12/544,484, filed Aug. 20, 2009, Office Action dated Jun. 3, 2011, 6 pages.
U.S. Appl. No. 11/969,343, filed Jan. 4, 2008, Office Action mailed Jun. 10, 2011, 13 pages.
Burger, E. et al., "Deploying CCXML for Application-Layer Call Control," Aug. 2006, 11 pages.
Kim et al., "Implementation of Third Party Based Call Control using Parlay Network API in SIP Environment," ICOIN 2003, LNCS 2662, 2003, pp. 416-425.
Romellini, C. et al., "CCXML: The Power of Standardization," Loquendo, Sep. 27, 2005.
U.S. Appl. No. 11/848,347, filed Aug. 31, 2007, Advisory Action mailed Jul. 27, 2010, 3 pages.
U.S. Appl. No. 11/848,347, filed Aug. 31, 2007, Office Action mailed Sep. 30, 2010, 19 pages.
U.S. Appl. No. 11/877,129, filed Oct. 23, 2007, Notice of Allowance mailed Aug. 5, 2010, 6 pages.
U.S. Appl. No. 11/943,101, filed Nov. 20, 2007, Office Action mailed Aug. 27, 2010, 11 pages.
U.S. Appl. No. 11/951,500, filed Dec. 6, 2007, Office Action mailed Sep. 1, 2010, 30 pages.
U.S. Appl. No. 12/019,299, filed Jan. 24, 2008, Final Office Action mailed Oct. 6, 2010, 20 pages.
U.S. Appl. No. 10/856,588, filed May 28, 2004, Advisory Action dated Jan. 5, 2010, 3 pages.

(56) References Cited

OTHER PUBLICATIONS

U.S. Appl. No. 10/856,588, filed May 28, 2004, Final Office Action dated Oct. 15, 2008, 11 pages.
U.S. Appl. No. 10/856,588, filed May 28, 2004, Final Office Action dated Oct. 20, 2009, 17 pages.
U.S. Appl. No. 10/856,588, filed May 28, 2004, Notice of Allowance dated Sep. 23, 2010, 8 pages.
U.S. Appl. No. 10/856,588, filed May 28, 2004, Office Action dated Mar. 16, 2009, 10 pages.
U.S. Appl. No. 10/856,588, filed May 28, 2004, Office Action dated Apr. 11, 2008, 16 pages.
U.S. Appl. No. 11/024,160, filed Dec. 27, 2004, Advisory Action dated Feb. 18, 2010, 3 pages.
U.S. Appl. No. 11/024,160, filed Dec. 27, 2004, Final Office Action dated Oct. 15, 2010, 11 pages.
U.S. Appl. No. 11/024,160, filed Dec. 27, 2004, Final Office Action dated Dec. 3, 2009, 11 pages.
U.S. Appl. No. 11/024,160, filed Dec. 27, 2004, Final Office Action dated Feb. 11, 2009, 9 pages.
U.S. Appl. No. 11/024,160, filed Dec. 27, 2004, Office Action dated Jun. 29, 2009, 9 pages.
U.S. Appl. No. 11/024,160, filed Dec. 27, 2004, Office Action dated Jun. 9, 2010, 10 pages.
U.S. Appl. No. 11/024,160, filed Dec. 27, 2004, Office Action dated Aug. 22, 2008, 8 pages.
U.S. Appl. No. 11/070,317, filed Mar. 1, 2005, Final Office Action dated Sep. 27, 2010, 8 pages.
U.S. Appl. No. 11/123,468, filed May 5, 2005, Advisory Action dated Feb. 17, 2010, 3 pages.
U.S. Appl. No. 11/123,468, filed May 5, 2005, Final Office Action dated Nov. 24, 2009, 19 pages.
U.S. Appl. No. 11/123,468, filed May 5, 2005, Office Action dated Apr. 10, 2009, 17 pages.
U.S. Appl. No. 11/123,468, filed May 5, 2005, Office Action dated Apr. 14, 2010, 16 pages.
U.S. Appl. No. 11/123,468, filed May 5, 2005, Final Office Action dated Nov. 10, 2010, 18 pages.
U.S. Appl. No. 11/123,471, filed May 5, 2005, Notice of Allowance dated Jun. 29, 2009, 6 pages.
U.S. Appl. No. 11/123,471, filed May 5, 2005, Office Action dated Jan. 23, 2009, 8 pages.
U.S. Appl. No. 11/130,636, filed May 16, 2005, Notice of Allowance mailed Aug. 18, 2010, 4 pages.
U.S. Appl. No. 11/939,705, filed Nov. 14, 2007, Office Action mailed Oct. 4, 2010, 21 pages.
Maretzke, Michael, "JAIN SLEE Technology Overview", <http://www.maretzke.de/pub/lectures/jslee_overview_2005/JSLEE_Overview_2005.pdf>, Apr. 12, 2005, 26 pages.
O'Doherty, Phelim, "JSLEE—SIP Servlet", <http://java.sun.com/products/jain/JSLEE-SIPServlet.pdf, 2003, 13 pages.
The Parlay Group, "Specifications", <http://web.archive.org/web/20050114014707/www.parlay.org/specs/index.asp>, Jan. 14, 2005, 2 pages.
U.S. Appl. No. 11/926,738, filed Oct. 29, 2007, Advisory Action mailed Sep. 3, 2010, 2 pages.
U.S. Appl. No. 11/926,738, filed Oct. 29, 2007, Office Action mailed Nov. 10, 2010, 12 pages.
U.S. Appl. No. 12/019,299, filed Jan. 24, 2008, Advisory Action dated Dec. 9, 2010, 3 pages.
U.S. Appl. No. 12/019,299, filed Jan. 24, 2008, Office Action mailed Jan. 24, 2011, 16 pages.
U.S. Appl. No. 10/855,999, filed May 28, 2004, Final Office Action dated Jan. 5, 2011, 19 pages.
U.S. Appl. No. 11/123,468, filed May 5, 2005, Advisory Action dated Jan. 18, 2011, 2 pages.
U.S. Appl. No. 12/364,642, filed Feb. 3, 2009, Office Action dated Dec. 20, 2010, 18 pages.
U.S. Appl. No. 11/357,653, filed Feb. 16, 2000, Office Action dated Jan. 20, 2011, 18 pages.

Wikipedia, "Parley", <http://web.archive.org/web/20050130172632/en.wikipedia.org/wiki/Parlay>, Jan. 30, 2005, 3 pages.
Wikipedia, "Object-Oriented Programming", <http://web.archive.org/web/20051211141918/http://en.wikipedia.org/wiki/Object-oriented_programming>, Dec. 11, 2005, 10 pages.
Wikipedia, "OSI model", <http://web.archive.org/web/20050907132012/http://en.wikipedia.org/wiki/Osi_model>, Sep. 7, 2005, 8 pages.
U.S. Appl. No. 11/848,347, filed Aug. 31, 2007, Final Office Action mailed Mar. 7, 2011, 21 pages.
U.S. Appl. No. 11/926,738, filed Oct. 29, 2007, Final Office Action mailed Mar. 17, 2011, 13 pages.
U.S. Appl. No. 11/943,101, filed Nov. 20, 2007, Final Office Action mailed Feb. 14, 2011, 11 pages.
U.S. Appl. No. 12/544,459, filed Aug. 20, 2009, Office Action dated Mar. 2, 2011, 10 pages.
U.S. Appl. No. 10/855,999, filed May 28, 2004, Advisory Action dated Mar. 16, 2011, 3 pages.
U.S. Appl. No. 11/024,160, filed Dec. 27, 2004, Office Action dated Feb. 7, 2011, 11 pages.
U.S. Appl. No. 11/939,705, filed Nov. 14, 2007, Final Office Action mailed Mar. 17, 2011, 21 pages.
Author Unknown, "Assuring Quality of Experience for IPTV—White Paper," Heavy Reading, Jul. 2006, 18 pages.
Author Unknown, "LTE Mobile Transport Evolution—Strategic White Paper," Alcatel Lucent, accessed Jan. 10, 2012 from http://lte.alcatel-lucent.com/locale/en_us/downloads/Alcatel-Lucent_LTE_Transport_WhitePaper.pdf, 2011, 16 pages.
Dhesikan, "Quality of Service for IP Videoconferencing—Engineering White Paper," Cisco Systems, Jun. 1, 2001, 16 pages.
U.S. Appl. No. 11/926,738, filed Oct. 29, 2007, Notice of Allowance mailed Aug. 5, 2011, 13 pages.
U.S. Appl. No. 11/943,101, filed Nov. 20, 2007, Office Action mailed Jul. 28, 2011, 11 pages.
U.S. Appl. No. 11/943,101, filed Nov. 20, 2007, Notice of Allowance mailed Dec. 9, 2011, 7 pages.
U.S. Appl. No. 11/951,500, filed Dec. 6, 2007, Advisory Action mailed Jul. 15, 2011, 3 pages.
U.S. Appl. No. 11/024,160, filed Dec. 27, 2004, Notice of Allowance dated Aug. 4, 2011, 15 pages.
U.S. Appl. No. 11/939,705, filed Nov. 14, 2007, Office Action mailed Sep. 28, 2011, 15 pages.
U.S. Appl. No. 12/045,220, filed Mar. 10, 2008, Office Action dated Sep. 27, 2011, 20 pages.
U.S. Appl. No. 12/019,335, filed Jan. 24, 2008, Final Office Action mailed Dec. 5, 2011, 19 pages.
U.S. Appl. No. 12/364,642, filed Feb. 3, 2009, Final Office Action dated Jul. 1, 2011, 20 pages.
U.S. Appl. No. 12/364,642, filed Feb. 3, 2009, Advisory Action dated Sep. 16, 2011, 3 pages.
U.S. Appl. No. 12/364,642, filed Feb. 3, 2009, Office Action dated Oct. 18, 2011, 21 pages.
U.S. Appl. No. 11/357,653, filed Feb. 16, 2006, Final Office Action dated Aug. 2, 2011, 19 pages.
U.S. Appl. No. 11/357,653, filed Feb. 16, 2006, Advisory Action dated Oct. 12, 2011, 3 pages.
U.S. Appl. No. 12/544,459, filed Aug. 20, 2009, Notice of Allowance mailed Aug. 22, 2011, 8 pages.
U.S. Appl. No. 12/544,471, filed Aug. 20, 2009, Office Action dated Jan. 6, 2012, 8 pages.
U.S. Appl. No. 12/544,484, filed Aug. 20, 2009, Final Office Action dated Dec. 1, 2011, 8 pages.
U.S. Appl. No. 11/949,930, filed Dec. 4, 2007, Office Action mailed Sep. 29, 2011, 19 pages.
U.S. Appl. No. 11/969,343, filed Jan. 4, 2008, Final Office Action mailed Oct. 21, 2011, 11 pages.
U.S. Appl. No. 11/969,343, filed Jan. 4, 2008, Advisory Action mailed Jan. 5, 2012, 3 pages.
U.S. Appl. No. 12/018,718, filed Jan. 23, 2008, Office Action mailed Jun. 22, 2011, 23 pages.
U.S. Appl. No. 12/019,299, filed Jan. 24, 2008, Final Office Action mailed Aug. 25, 2011, 20 pages.

(56) References Cited

OTHER PUBLICATIONS

U.S. Appl. No. 11/939,705, filed Nov. 14, 2007, Notice of Allowance mailed May 15, 2013, 92 pages.
U.S. Appl. No. 12/018,718, filed Jan. 23, 2008, Non-Final Office Action mailed Apr. 24, 2013, 114 pages.
U.S. Appl. No. 12/948,450, filed Nov. 17, 2010, Notice of Allowance mailed May 10, 2013, 28 pages.
U.S. Appl. No. 12/949,183, filed Nov. 18, 2010, Final Office Action mailed Apr. 17, 2013, 30 pages.
U.S. Appl. No. 12/949,287, filed Nov. 18, 2010, Final Office Action mailed Apr. 23, 2013, 28 pages.
U.S. Appl. No. 12/957,740, filed Dec. 1, 2010, Advisory Action mailed May 21, 2013, 13 pages.
U.S. Appl. No. 13/029,226, filed Feb. 17, 2011, Non-Final Office Action mailed May 28, 2013, 47 pages.
U.S. Appl. No. 11/951,500, filed Dec. 6, 2007, Notice of Allowance mailed Jul. 23, 2012, 7 pages.
U.S. Appl. No. 11/070,317, filed Mar. 1, 2005, Notice of Allowance dated Sep. 4, 2012, 8 pages.
U.S. Appl. No. 12/364,642, filed Feb. 3, 2009, Advisory Action dated Sep. 14, 2012, 3 pages.
U.S. Appl. No. 11/357,653, filed Feb. 16, 2006, Final Office Action dated Sep. 21, 2012, 21 pages.
U.S. Appl. No. 12/544,471, filed Aug. 20, 2009, Final Office Action dated Jul. 30, 2012, 26 pages.
U.S. Appl. No. 12/019,299, filed Jan. 24, 2008, Final Office Action mailed Aug. 15, 2012, 19 pages.
U.S. Appl. No. 13/416,413, filed Mar. 9, 2012, Notice of Allowance mailed Oct. 2, 2012, 5 pages.
U.S. Appl. No. 10/855,999, filed May 28, 2004, Non-Final Office Action dated Mar. 28, 2013, 42 pages.
U.S. Appl. No. 10/855,999, filed May 28, 2004, Advisory Action dated Mar. 18, 2011, 5 pages.
U.S. Appl. No. 11/848,347, filed Aug. 31, 2007, Notice of Allowance mailed Mar. 2, 2012, 9 pages.
U.S. Appl. No. 11/951,500, filed Dec. 6, 2007, Office Action mailed Apr. 11, 2012, 6 pages.
U.S. Appl. No. 11/070,317, filed Mar. 1, 2005, Office Action dated Mar. 15, 2012, 10 pages.
U.S. Appl. No. 11/939,705, filed Nov. 14, 2007, Final Office Action mailed Mar. 15, 2012, 16 pages.
U.S. Appl. No. 11/939,705, filed Nov. 14, 2007, Advisory Action mailed Jun. 1, 2012, 9 pages.
U.S. Appl. No. 11/939,705, filed Nov. 14, 2007, Office Action mailed Jul. 6, 2012, 13 pages.
U.S. Appl. No. 12/045,220, filed Mar. 10, 2008, Advisory Action dated May 31, 2012, 3 pages.
U.S. Appl. No. 12/045,220, filed Mar. 10, 2008, Final Office Action dated Mar. 15, 2012, 20 pages.
U.S. Appl. No. 12/019,335, filed Jan. 24, 2008, Advisory Action mailed Feb. 27, 2012, 3 pages.
U.S. Appl. No. 12/364,642, filed Feb. 3, 2009, Final Office Action dated Jun. 19, 2012, 24 pages.
U.S. Appl. No. 11/357,653, filed Feb. 16, 2006, Office Action dated Apr. 26, 2012, 18 pages.
U.S. Appl. No. 12/544,484, filed Aug. 20, 2009, Advisory Action dated Feb. 9, 2012, 2 pages.
U.S. Appl. No. 12/490,540, filed Jun. 24, 2009, Office Action dated Jul. 6, 2012, 16 pages.
U.S. Appl. No. 11/949,930, filed Dec. 4, 2007, Notice of Allowance mailed Mar. 19, 2012, 19 pages.
U.S. Appl. No. 12/018,718, filed Jan. 23, 2008, Final Office Action mailed Feb. 1, 2012, 30 pages.
U.S. Appl. No. 12/019,299, filed Jan. 24, 2008, Advisory Action mailed Nov. 3, 2011, 2 pages.
U.S. Appl. No. 12/019,299, filed Jan. 24, 2008, Office Action mailed Feb. 16, 2012, 18 pages.
U.S. Appl. No. 12/948,247, filed Nov. 17, 2010, Office Action mailed Jul. 6, 2012, 14 pages.
U.S. Appl. No. 12/791,129, filed Jun. 1, 2010, Office Action mailed Jul. 10, 2012, 14 pages.
U.S. Appl. No. 13/416,413, filed Mar. 9, 2012, Office Action mailed Apr. 27, 2012, 11 pages.
3rd Generation Partnership Project 2, "Presence Service: Architecture and Functional Description", doc. No. 3GPP2 X.S0027-001-0, published on Sep. 2004, 32 pages.
Day, et al., "RFC 2778, A Model for Presence and Instant Messaging", published on Feb. 2000, 12 pages.
U.S. Appl. No. 11/070,317, filed Mar. 1, 2005, Notice of Allowance dated Oct. 19, 2012, 11 pages.
U.S. Appl. No. 11/939,705, filed Nov. 14, 2007, Final Office Action mailed Dec. 5, 2012, 18 pages.
U.S. Appl. No. 12/364,642, filed Feb. 3, 2009, Notice of Allowance dated Nov. 14, 2012, 8 pages.
U.S. Appl. No. 11/357,653, filed Feb. 16, 2006, Advisory Action dated Dec. 4, 2012, 3 pages.
U.S. Appl. No. 12/544,471, filed Aug. 20, 2009, Advisory Action dated Nov. 9, 2012, 3 pages.
U.S. Appl. No. 12/544,471, filed Aug. 20, 2009, Notice of Allowance dated Mar. 12, 2013, 78 pages.
U.S. Appl. No. 12/490,540, filed Jun. 24, 2009, Notice of Allowance dated Feb. 4, 2013, 43 pages.
U.S. Appl. No. 12/019,299, filed Jan. 24, 2008, Advisory Action mailed Oct. 29, 2012, 32 pages.
U.S. Appl. No. 12/019,299, filed Jan. 24, 2008, Non Final Office Action mailed Dec. 7, 2012, 21 pages.
U.S. Appl. No. 12/948,247, filed Nov. 17, 2010, Final Office Action mailed Feb. 11, 2013, 25 pages.
U.S. Appl. No. 12/791,129, filed Jun. 1, 2010, Final Office Action mailed Dec. 7, 2012, 9 pages.
U.S. Appl. No. 12/948,450, filed Nov. 17, 2010, Non-Final Office Action mailed Nov. 7, 2012, 48 pages.
U.S. Appl. No. 12/949,183, filed Nov. 18, 2010, Non-final Office Action mailed Nov. 16, 2012, 69 pages.
U.S. Appl. No. 12/949,287, filed Nov. 18, 2010, Non-final Office Action mailed Nov. 19, 2012, 70 pages.
U.S. Appl. No. 12/957,740, filed Dec. 1, 2010, Non-final Office Action mailed Oct. 17, 2012, 52 pages.
U.S. Appl. No. 12/957,740, filed Dec. 1, 2010, Final Office Action mailed Feb. 15, 2013, 25 pages.
U.S. Appl. No. 13/029,219, filed Feb. 17, 2011, Non-Final Office Action mailed Mar. 20, 2013, 65 pages.
U.S. Appl. No. 10/855,999, filed May 28, 2004, Final Office Action dated Nov. 18, 2013, 14 pages.
U.S. Appl. No. 12/045,220, filed Mar. 10, 2008, Non-Final Office Action dated Oct. 7, 2013, 19 pages.
U.S. Appl. No. 11/357,653, filed Feb. 16, 2006, Non-final Office Action dated Jul. 11, 2013, 26 pages.
U.S. Appl. No. 12/018,718, filed Jan. 23, 2008, Final Office Action mailed Sep. 10, 2013, 55 pages.
U.S. Appl. No. 12/791,129, filed Jun. 1, 2010, Non-Final Office Action mailed Sep. 11, 2013, 10 pages.
U.S. Appl. No. 12/949,183, filed Nov. 18, 2010, Advisory Action mailed Jun. 28, 2013, 3 pages.
U.S. Appl. No. 12/949,183, filed Nov. 18, 2010, Non-Final Office Action mailed Sep. 9, 2013, 18 pages.
U.S. Appl. No. 12/949,287, filed Nov. 18, 2010, Non-final Office Action mailed Aug. 8, 2013, 24 pages.
U.S. Appl. No. 12/957,740, filed Dec. 1, 2010, Non-final Office Action mailed Aug. 15, 2013, 17 pages.
U.S. Appl. No. 13/029,219, filed Feb. 17, 2011, Final Office Action mailed Oct. 11, 2013, 22 pages.
U.S. Appl. No. 12/957,697, filed Dec. 1, 2010, Non-Final Office Action mailed Oct. 1, 2013, 10 pages.

* cited by examiner

USING LOCATION AS A PRESENCE ATTRIBUTE

CROSS-REFERENCES TO RELATED APPLICATIONS

This application claims the benefit of U.S. Provisional Application No. 60/896,676, filed Mar. 23, 2007 by Maes and entitled "Call Control Driven MVC Programming Model for Mixing Web and Call or Multimedia Applications," of which the entire disclosure is incorporated herein by reference.

BACKGROUND OF THE INVENTION

Embodiments of the present invention relate generally to methods and systems for determining location of an entity and more particularly to using location information as an attribute of a presence profile.

The physical location of a device can be determined in a number of different ways. For example, the location of a mobile device communicating via various wireless technologies can be determined by triangulating the wireless signal between antennas, cell towers, access points, etc. In other cases, technology incorporated on the handset can be used to determine location. For example, many mobile devices now incorporate a Global Positioning System (GPS) receiver that can be used to determine the device's physical location. In other cases, a tracking signal, or data entered by the user may be used to determine the device's location. Furthermore, various standards for determining and utilizing location information for a mobile device have been established. For example, various standard bodies such as 3rd Generation Partnership Project (3GPP), 3rd Generation Partnership Project 2(3GPP2), European Telecommunications Standards Institute (ETSI), Open Mobile Alliance (OMA), International Telecommunications Union (ITU), Parlay, etc. have established technologies for determining location of a device and Application Program Interfaces (APIs) for acquiring and utilizing such information. That is, these models rely on location information determined by one or more elements of the network, for example by triangulating a wireless, determining cell location, determining access point in WiFi types of systems, querying or submitting technology such as GPS incorporated on the device, or by another method, and provided to other elements of the network through the standard API defined for that network or technology.

However, even with GPS, there are no models to directly expose this location information to an application of a server or other device. That is, the use of the location information is often based on local applications on the device (e.g. a navigation system) or submission by a local client of the location as an argument to a request to a server (e.g. as a field in a Hyper Text Transfer Protocol (HTTP) post or web service request). However, none of the current techniques for utilizing location information really provide a clear programming model for managing and using location, notifying applications, filtering the information, etc. That is, none of the current techniques provide a generic model for managing and utilizing location information regardless of how or from where it is obtained. Hence, there is a need for improved methods and systems for determining location of a device and/or entity and methodologies for using this information in applications regardless of wherever and whatever these applications are.

BRIEF SUMMARY OF THE INVENTION

Embodiments of the invention provide systems and methods for determining location of a principal. Generally speaking, in various embodiments of the invention, location can be a set of one or more presence attributes in a presence data model. That is, since presence data models including but not limited to those such as used with Extensible Messaging and Presence Protocol (XMPP), Session Initiation Protocol (SIP), SIP Instant Messaging and Presence Leveraging Extensions (SIMPLE), OMA SIP/SIMPLE presence XML Document Management (XDM) enablers, etc. are extensible (i.e. new attributes can be defined), a presence attribute can be defined for current location information that can then be used, i.e., published/subscribed, as with other presence attributes. Thus, when the location of the principal changes or another location event occurs, the location attribute in the presence profile of the principal can be updated and the update can be published to authorized subscribers, for example via a presence server.

According to one embodiment, a method of providing location information for a principal can comprise receiving a presence event related to the principal. The presence event can be related to the location of the principal, i.e., a location of the principal can be indicated by or determined based on the presence event. The location of the principal can be stored as a location attribute of a presence profile of the principal. In some cases, one or more policies can be applied to the presence event. In such cases, storing the location of the principal as the location attribute of the presence profile of the principal can be based on the one or more policies. The method can further comprise providing access to the location attribute of the presence profile of the principal to one or more subscribers of a presence service. In some cases, providing access to the location attribute of the presence profile of the principal to one or more subscribers of the presence service can be based on one or more policies of the presence service. Additionally, or alternatively, providing access to the location attribute of the presence profile of the principal to one or more subscribers of the presence service can comprise providing one or more other services. The other services can include, for example, a Ring-back tone (RBT) service that changes the RBT based on location, a proximity service that triggers notifications when an entity is nearby another user also characterized by a location as a presence attribute, a certain business, monument, point of interest, coordinates, etc.

In some cases, the method can comprise receiving a request to access the location attribute of the presence profile of the principal. For example, the request to access the location attribute of the presence profile of the principal can comprise a request to read the location attribute. In another example, the request to access the location attribute of the presence profile of the principal can comprise a request to modify the location attribute. The request can comprise, for example, a request from a subscriber, i.e., a request to subscribe, to the presence information. In such a case, the subscribers can be notified of a change in the location attribute or upon the occurrence of some other event. Providing the notification to the subscriber(s) can be based on application of one or more policies. In another example, the request to access the location attribute can comprise a request from a non-subscriber to the presence service. In such a case, the request can be received, for example, via a northbound interface of a presence enabler of the presence service that provides a abstract interface to the functions of the presence service. In response to the request, access to the location attribute of the presence profile of the principal can be provided. Providing access to the location attribute of the presence profile of the principal to one or more subscribers of a presence service can be based on one or more policies of the presence service.

In some cases, receiving the presence event related to the principal can comprise receiving the presence event from a device of the principal. In such a case, the presence event can indicate a location determined by the device. The device may pass the presence event to the presence service as a presence user agent or via other data communication channels/mechanisms such as an HTTP submit, etc. Additionally or alternatively, receiving the presence event related to the principal can comprise receiving the presence event from a presence server of a presence service provider or third party source or a Presence Network Agent (PNA). In such a case, the presence event can indicate to the presence service a location determined by the third-party or PNA.

According to another embodiment, a method of obtaining location information for a principal can comprise subscribing to presence information of a principal and receiving a notification of a change in a location attribute of a presence profile of the principal. Receiving the notification of the change in the location attribute of the presence profile of the principal can be based on one or more policies of the presence service. In another case, accessing the presence profile of the principal can further comprise reading the location attribute from the presence profile, i.e., querying a presence service for location information of the principal and receiving information from a location attribute of a presence profile of the principal in response. Additionally or alternatively, the presence information can be separately written to the presence server, for example, via a northbound interface of a presence enabler of the presence service. Reading the location attribute from the presence profile can be based on one or more policies of the presence service. In other cases, accessing the presence profile of the principal can further comprise modifying the location attribute from the presence profile. Modifying the location attribute from the presence profile can be based on one or more policies of the presence service.

According to yet another embodiment, a system can comprise a communications network and a user agent communicatively coupled with the communications network. A presence server can be communicatively coupled with the communications network and adapted to provide a presence service. The presence service can receive a presence event related to the user agent via the communications network and store a location of the user agent as a location attribute of a presence profile of the user associated with the user agent.

A subscriber to the presence service of the presence server can be communicatively coupled with the communications network. In such a case, the presence server can be further adapted to provide access to the location attribute of the presence profile of the user associated with the user agent of the subscriber. The presence server can be further adapted to provide access to the location attribute of the presence profile of the user associated with the user agent of the subscriber based on one or more policies of the presence service (e.g., who can subscriber, what can be provided such as exact location, coarse location, region, city, etc., how is it presented/transformed etc). In some cases, providing access to the location attribute of the presence profile of the user associated with the user agent of the subscriber can comprise providing a notification of a change in status of the presence profile and/or allowing the subscriber to read the location attribute. In other cases, providing access to the location attribute of the presence profile of the user associated with the user agent of the subscriber can comprise allowing the subscriber to query and/or modify the location attribute, for example, via a northbound interface of a presence enabler of the presence service that provides an abstraction of the functions of the presence service.

In some cases, the user agent can be adapted to determine a location for a device upon which the user agent is executing and generate the presence update/publication event. In such a case, the presence event can indicate the location for the device and the presence server can determine the location of the device based on the location of the device indicated by the presence event. The location information can then be available for queries by authorized parties and/or notification to authorized subscribers. Additionally or alternatively, the presence event can be generated by other sources such as network sources that uses other means to determine the location then publishes the location on behalf of the user in the presence server subject to policies. For example, a user agent can determine the location for the source then publish the location as a user agent to the presence server. For example, the user agent can publish its location to a Presence Network Agent (PNA) or have a PNA query the device agent (or another source). Then the PNA can publish the presence information in the presence server. Alternatively, instead of using a PNA, an entity can ask for or receive the location from the user agent and then use the northbound interface of the presence server to update the presence information in the presence server.

According to still another embodiment, a machine-readable medium can have stored thereon a series of instructions which, when executed by a processor, cause the processor to provide location information for a principal by receiving a presence event related to the principal and storing a location of the principal as a location attribute of a presence profile of the principal. Access to the location attribute of the presence profile of the principal can be provided to one or more subscribers of a presence service. Providing access to the presence profile of the principal can comprise publishing an update of the presence profile to subscribers or allowing an authorized party to submit a query to obtain information from the presence profile. Providing access to the location attribute of the presence profile of the principal to one or more subscribers of the presence service can be based on one or more policies of the presence service. In some cases, providing access to the location attribute of the presence profile of the principal to one or more subscribers of the presence service can comprise allowing the one or more subscribers to read the location attribute. In other cases, providing access to the location attribute of the presence profile of the principal to one or more subscribers of the presence service can comprise allowing the one or more subscribers to modify the location attribute.

In some cases, receiving the presence event related to the principal can comprise receiving the presence event from a device of the principal. In such a case, the presence event can indicate a location determined by the device (e.g. GPS, manually entered by user, etc.). Additionally or alternatively, receiving the presence event related to the principal can comprise receiving the presence event from a presence server of a presence service provider or third party source. In such a case, the presence event can indicate to the presence service a location determined by the third-party.

According to yet another embodiment, a machine-readable medium can have stored thereon a series of instruction which, when executed by a processor, cause the processor to obtain location information for a principal by subscribing to a presence service and accessing a presence profile of the principal maintained by the presence service. The presence profile can include a location attribute indicating a location for the principal. Accessing the presence profile of the principal can comprise receiving an update of a change in the presence profile or querying the presence server to obtain information from the presence profile. In some cases, accessing the presence profile of the principal can comprise reading the location attribute from the presence profile. Reading the location attribute from the presence profile can be based on one or more policies of the presence service. In other cases, accessing the presence profile of the principal can comprise modifying the location attribute from the presence profile. Modifying the location attribute from the presence profile can be based on one or more policies of the presence service.

DETAILED DESCRIPTION OF THE INVENTION

Figure 1:
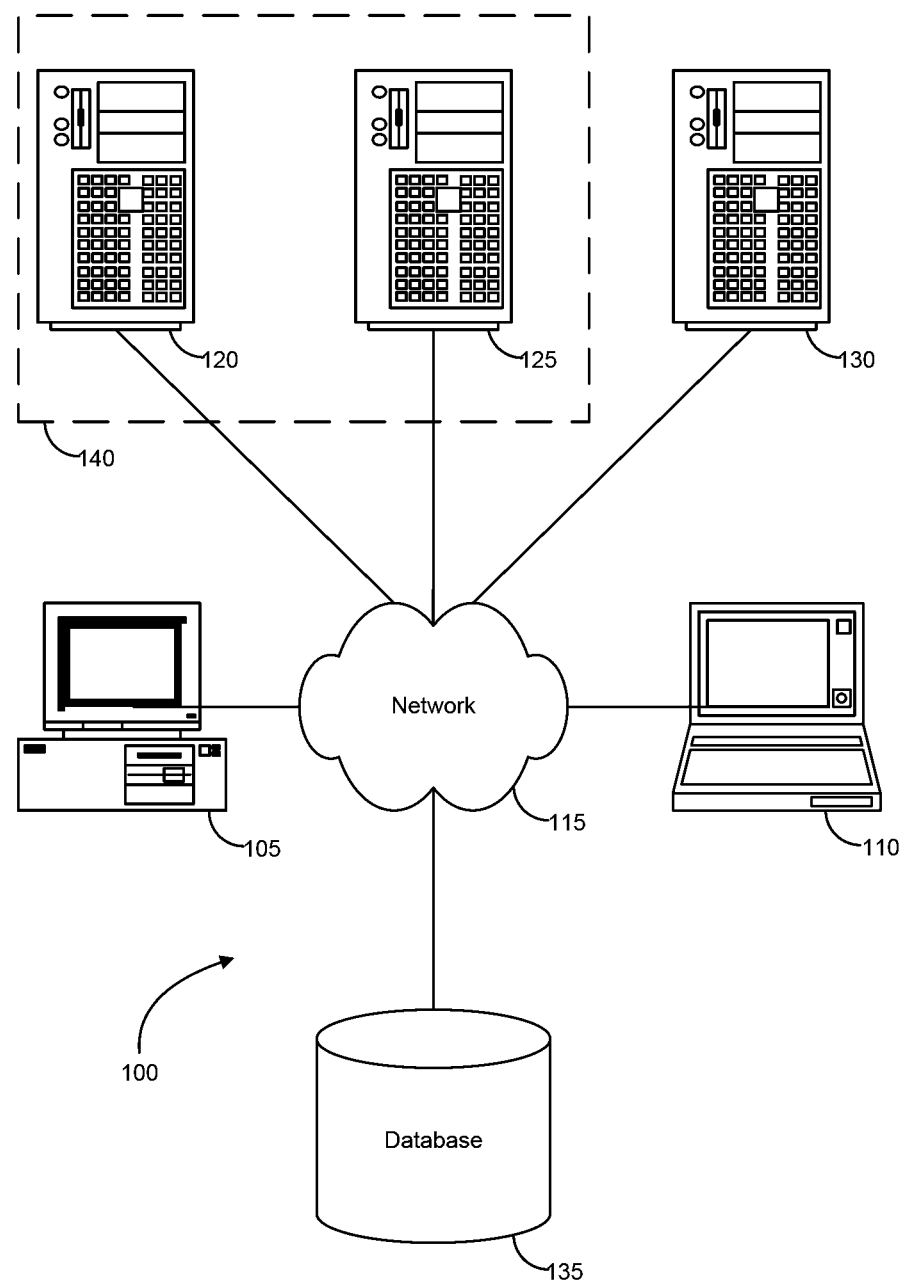
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for obtaining and utilizing location information for a device in a generic manner that is independent of the manner in which that information is generated. More specifically, embodiments of the present invention provide for using location information as an attribute of a presence profile for a user of the device. As used herein, the term location refers to the physical location or approximate location of the device at a given time or during an approximate time period. As will be seen, the location of a device can be determined by any of a variety of methods including those define by various standard bodies such as 3rd Generation Partnership Project (3GPP), 3rd Generation Partnership Project 2(3GPP2), European Telecommunications Standards Institute (ETSI), Open Mobile Alliance (OMA), International Telecommunications Union (ITU), Parlay, Internet Engineering Task Force (IETF), etc. as well as things like physical WiFi cell determination by identity of associated access point etc. Additionally or alternatively, the location of the device can be determined by various elements of one or more communications networks with which the device is coupled, by technology implemented on the device such as GPS or technologies cell location, base station ID, triangulation etc, or some combination thereof.

The presence event can also be generated by other sources such as network sources that use other means to determine the location then publish the location on behalf of the user in the presence server subject to policies. Additionally or alternatively, receiving the presence event related to the principal can comprise receiving (e.g., as input or as published presence) from a Presence Network Agent (PNA) to the presence server. The presence event published to the presence server can come from a presence or location service provider or third party source. In such a case, the presence event can indicate to the presence service a location determined by the third-party. Additionally or alternatively a user agent can determine the location for the source then publish the location as a user agent or PNA to the presence server. In yet other embodiments, the location information can be directly provided/entered by the user, e.g., who fills a street address or other location information. However, it should be understood that exactly how and by what device or equipment the location is determined, embodiments of the present invention provide for utilizing this information in a generic manner, independent of its source or any (standard) interfaces.

Presence is defined here, and conventionally defined, as a transient state of a principal that can be used by other entities to make a decision about how to best communicate with the principal. A principal can be defined as an entity that has an identity, that is capable of providing consent and other data, and to which authenticated actions are done on its behalf. Therefore, a principal may be a computing device but it may also be a person across multiple computing devices or even an organization, a service, or a group of persons. For example, user A can be subscribed to the presence of user B via a presence service. If user A wants to communicate with user B at a given instant, he can make a decision in real-time depending upon the presence information of B, that is, user A can decide how and where to communicate with user B based on user B's presence information at the time. Presence information can be obtained using a subscribe/publish model wherein a principal publishes its presence to a presence service which in notifies authorized subscribers of the information or change of information. Additionally or alternatively, presence information can be obtained by interrogating or querying a service, i.e., a presence service, provided by a service provider that maintains a presence profile for the principal. Based on the presence profile, a determination can be made as to the current presence of the principal. Presence is distinct from location in that presence indicates only whether a principal is present or available. Location, on the other hand, indicates the physical locations, e.g., longitude and latitude coordinates and/or altitude, of the principal or a device associated with the principal. It may then also be transformed into geo-location/geodesic information like an address associated with a location identified in terms of longitude and latitude coordinates.

As will be described in detail below, providing location information for a principal according to one embodiment of the present invention can comprise receiving at a presence server a presence event related to the principal. The presence event can be, for example, an update of the presence attributes of the principal. The location of the principal can be stored by the presence server as a location attribute of a presence profile of the principal. This is an extension of traditional notions of presence and presence data models such as provided by Internet Engineering Task Force (IETF), OMA and others that are extensible. It is an extension of the notion of presence to characterize location of the user instead of metadata indicating how to best communicate with the user. That is, since presence data models including but not limited to those such as used with Extensible Messaging and Presence Protocol (XMPP), Session Initiation Protocol (SIP), SIP Instant Messaging and Presence Leveraging Extensions (SIMPLE), OMA SIP/SIMPLE presence XML Document Management (XDM) enablers, etc. are extensible (i.e. new attributes can be defined), a presence attribute can be defined for current location information that can then be used, i.e., published/subscribed, as with other presence attributes. However, it should be noted that embodiments of the present invention are not limited to any particular presence model, protocol, etc. and can be implemented in a variety of other different protocols or environments including but not limited to Parlay, OMA, IMPS, or proprietary networks used with multimedia IM by Skype, MSN, AIM Y!, etc.

Access to the location attribute of the presence profile of the principal can then be provided (possibly transformed and/or filtered) to one or more authorized subscribers of a presence service or provided in response to queries by authorized principals. Providing access to the presence profile of the principal can comprise publishing an update of the presence profile to subscribers or allowing an authorized party to submit a query to obtain information from the presence profile. Also as will be described, one or more policies can be maintained and applied by the presence service when receiving and/or accessing the location attribute of the presence profile of the user of the device. Such policies can be used to determine, for example, who can access the attribute, what attributes can be distributed, how they may be transformed before being distributed, etc. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g. the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
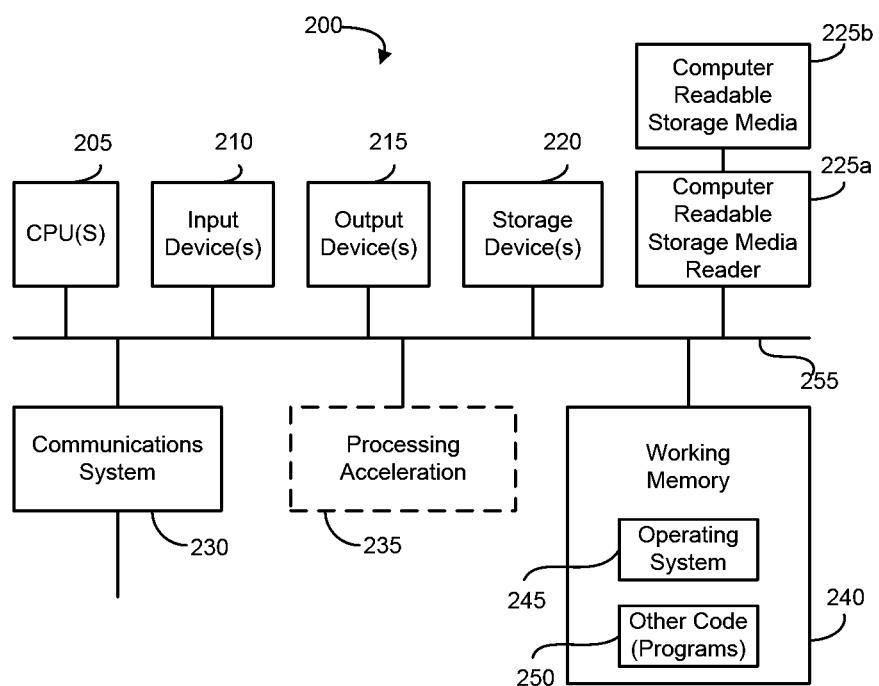
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
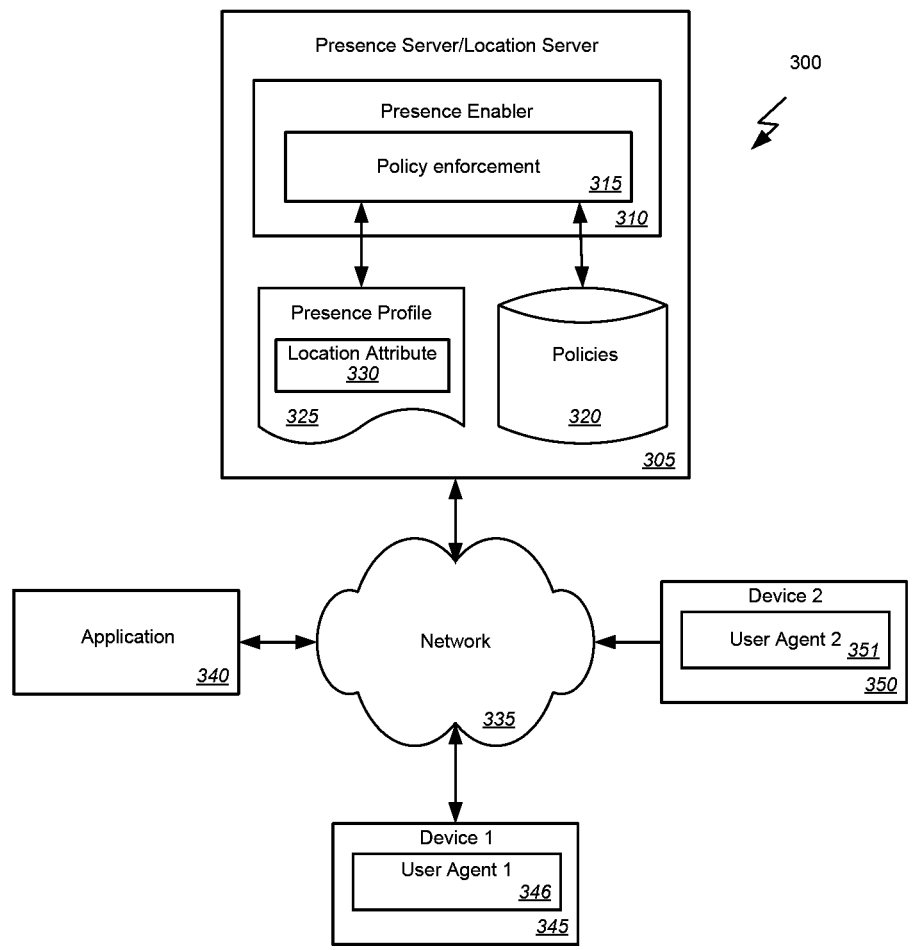
FIG. 3 is a block diagram illustrating, at a high-level, functional components of a system for maintaining and providing location information for a device according to one embodiment of the present invention.

FIG. 3 is a block diagram illustrating, at a high-level, functional components of a system for maintaining and providing location information for a principal according to one embodiment of the present invention. In this example, the system 300 includes a communications network 335 and a number of devices 345 and 350 such as mobile devices communicatively coupled with the communications network. It should be noted that, while described here as mobile devices in one embodiment, the devices 345 and 350 need not be mobile. Rather, any type of devices is considered to be within the scope of the present invention. The communications network 335 can comprise any type of network such as described above. According to one embodiment, the communications network 335 can comprise a wireless communications network such as a cellular network. The devices 345 and 350 can comprise any type of mobile or other device such as a cell phone, smart phone, Personal Digital Assistant (PDA), pager, or any other type of device adapted to communicate via the communications network 335. According to one embodiment, each device 345 and 350 can implement or provide a user agent 346 and 351 or other client application for interacting with a presence service. The principal can be associated with one or more of the devices 345 and 350 and/or one or more of the user agents 346 and 351. The system 300 can also include an application 340 executing and/or residing, for example, on a server (not shown here), on a separate client (not shown here), another third-party system, a client such as one of the devices 345 and 350, or on the location server 305.

A presence server/location server 305 can also be communicatively coupled with the communications network 335.

The presence server/location server 305 can include a presence enabler 310. The presence enabler can be adapted to provide a presence service with policy enforcement to affect, for example, management of buddies/subscribers to presence authorized principals, preferences of user, credentials, etc. An exemplary implementation can be the combination of an OMA presence enbaler, XDM enabler and RLS enablers, etc. As noted above, the presence service provided via the presence enabler 310 of the presence server/location server 305 can maintain a set of presence profiles for any number of principals participating in the service. For example, a presence profile 325 can be maintained for a user of one (or more) of the wireless devices 345. The presence profile 325 can, for example, identify the principal and/or the device 345 and indicate presence information such as whether the device is currently present on the communications network 335.

The presence enabler 310 can also be adapted to receive a presence event related to the device 345 via the communications network 335. The presence event can be, for example, a response to a periodic check or query by the presence service 315 of the location of the device 345, response to a request for the current location of the device 345 by another element of the system 300 such as another device 350 or application 340, an update of the location from the device 345 or another element of the system 300 such as an application 340 that, for example, determines the location via other channels like radio signal triangulation etc. or via input for example from a web site submit of the address by the user or other third party etc., or other event or occurrence. A location of the device 345 can be then be determined based on the presence event.

Application 340 can be adapted to perform various roles. For example, the application 340 can function as a requester of and/or subscriber to location information of one or more principals and provide other services based thereon. Such services can include, for example, a proximity service as described below with reference to FIG. 8 or a location based targeted advertisement service. In another role, the application 340 can be adapted to determine location of one or more principals and publish it as a location attribute via a presence update or in answer to a request by a presence server. The location information can be determined by the application 340 in any of a variety of ways. For example, a present location can be determined as described in U.S. patent application Ser. No. 11/424,451 filed Jun. 15, 2006 by Maes and entitled PAST PRESENCE HINTS, the entire disclosure of which is incorporated herein by reference for all purposes.

As noted above, the location of the device 345 can be determined by any of a variety of methods and by various elements of one or more communications networks 335 with which the device 345 is coupled, by technology implemented on the device 345 such as GPS or technologies and indicated in the presence event, or some combination thereof, manual input from the user, etc. The determined location of the device 345 can be stored by the presence service 310 as a location attribute 330 of the presence profile 325 of the user of the device 345.

Access to the location attribute 330 of the presence profile 325 of the user of the device 345 can then be provided to one or more subscribers of the presence service such as another device 350, an application 340 or service, or other element/resource (e.g., a network resource). Providing access to the presence profile of the principal can comprise providing a notification of an update or change in the presence profile to one or more authorized users or subscribers or allowing the one or more authorized users or subscribers to query the presence server to obtain information from the presence profile. That is, in some cases, providing access to the location attribute 330 of the presence profile 325 of the user of the device 345 can comprise allowing the entity, such as the application 340 or user agent 351 of the other device 350 to read the location attribute 330 by receiving the subscribed events or by receiving a reply to a query. Note that it is possible that the subscriber or requester receives a filtered or transformed version or subset of the attributes. In other cases, providing access to the location attribute 330 of the presence profile 325 of the user of the device 345 to an entity such as the application 340 can comprise allowing the entity to modify the location attribute 330 or a subset or transformed version of them, e.g., coordinates converted into a street address etc.

According to one embodiment, one or more policies 320 can be maintained and applied by the presence enabler 310, for example by a policy enforcement module that can be implemented as part of the enabler 315. As used herein the term policy refers to a combination of one or more conditions and a set of one or more associated actions to be performed upon the condition(s) being satisfied. That is, the policies 320 can define conditions to be met and corresponding actions to be taken when receiving and/or accessing the location attribute of the presence profile of user of the device. For example, the policies can define which user agents 346 and 351, devices 345, 350, applications 340 or other elements or entities are authorized to access the location attribute and/or presence profile 325 and what types of access, i.e., reading, modifying, etc., can be granted. Additionally or alternatively, the policies 320 can define conditions and actions for use by the presence service 310 in updating and/or managing the location attribute 330 and/or presence profile 325 e.g., what is shown to who, how is it transformed, under what conditions etc. Other possible policies, i.e., any combination of any condition and any action, are contemplated and considered to be within the scope of the present invention.

In use, for example, a client device such as device 345 may be equipped with GPS or may be otherwise adapted to determine its current location. In another example, the device 345 may be adapted to receive manual input of a location from the user of the device. Regardless of exactly how the device 345 determines its current location, the device 345 can provide, or answer requests/queries about, or publish the location as a presence attribute to the presence server 305. Note that, as mentioned above, the presence can be determined by servers or applications elsewhere, e.g. a location server, application server, etc., that receives an address or other location information submitted by the user and obtained as published location information or in response to queries. The presence server 305 can in turn maintain the location information as an attribute 330 of a presence profile 325 of the principal associated with the device 345. Applications on other clients, the server 305, or other third-party applications can use the location information by interacting with presence server (e.g., by subscribing via any protocol like e.g. XMPS, SIP/SIMPLE or ParlayX) to the location attribute 330 and receiving notification of changes and/or by querying the presence server 305 (e.g. via Parlay X)). In particular implementations, a location server may be built as a presence server loading location attributes (i.e. the presence server can expose a location API or other northbound interface to behave like a location server) or a server that subscribes to the location attribute of presence then behaves as a presence server.

For example, a user agent can determine the location for the source then publish the location as a user agent to the presence server. For example, the user agent can publish its location to a Presence Network Agent (PNA) or have a PNA query the device agent (or another source). Then the PNA can publish the presence information in the presence server. Alternatively, instead of using a PNA, an entity can ask for or receive the location from the user agent and then use the northbound interface of the presence server to update the presence information in the presence server. This should not be confused with the way that the location is determined by the user agent, PNA, or other entity which may determine the location or ask another entity for it. It should also not be confused with how the location is refreshed in the presence server, i.e. if the updates take place when the location changes, periodically or when there is a request to update the location. It should also be understood that each of these different implementation are considered to be within the scope of the present invention. Furthermore, it should be understood that, in various implementations, the system and elements used can vary significantly and are not limited to those illustrated here. For example, the application 340 need not be implemented on a server. Rather, the application 340 can be implemented on the client device 345. Other variations are also contemplated and considered to be within the scope of the present invention.

Figure 4:
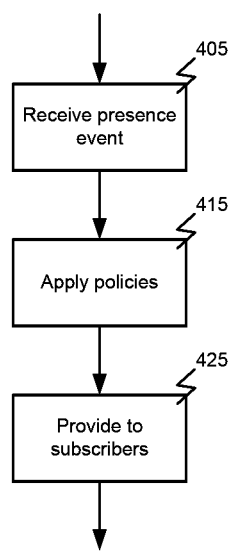
FIG. 4 is a flowchart illustrating a process for providing location information for a device according to one embodiment of the present invention.

FIG. 4 is a flowchart illustrating an exemplary process for providing location information for a device according to one embodiment of the present invention. It should be understood that this process is offered by way of example and can take place in many different ways as described above. More specifically, this example illustrates a process that may be performed by a presence service as described above to provide location information to one or more subscribers to or users of the service. In this example, processing begins with receiving 405 a presence event related to the principal. The presence event can comprise, for example, a change or request to update the location of the principal. That is, receiving 405 the presence event can comprise, for example, receiving 405 a request to modify or update the location attribute. In some cases, receiving 405 the presence event related to the principal can comprise receiving the presence event from a device of the principal. In such a case, the presence event can indicate a location determined by the device. In other cases, the presence event may be received 405 from another element, such as an application or service that periodically updates the location of the device and the location of the device and thus may also indicate the location of the principal.

One or more policies can be applied 415 to the event and/or the location information. It should be understood that, while illustrated here as occurring after a determination 410 of location information, the policies can be applied to the location event either before or after any determination 410 of the location information. As noted above, the policies can comprise any of a variety of possible policies to handle or affect the location event and/or location information. For example, the policies can comprise polices for filtering and/or transforming location information related to the presence event, determining how or to which subscribers to provide the location information, how to present the location information, e.g., what information to include with notifications or answers to queries, what information to store, etc. That is, the policies can define which devices, applications, services, etc can update or modify the location of the device and/or under what circumstances as well as which subscribers or users should be informed and how.

Based on application 415 of the policies, access to the location attribute and/or the presence profile can be provided 425 to one or more authorized users or subscribes. As noted above, providing 425 access to the location attribute and/or the presence profile can comprise providing a notification of a change in the location attribute to authorized subscribers and/or allowing authorized subscribers or users to query the presence service. Thus, in some cases, the location attribute can be published to one or more subscribers to the presence service. In some cases, a subsequent request to access the location attribute of the presence profile of the user of the device can be received. For example, the request to access the location attribute of the presence profile of the user of the device can comprise a request to read the location attribute. In another example, the request to access the location attribute of the presence profile of the user of the device can comprise a request to modify, e.g., update, the location attribute. A determination can be made, for example based on one or more policies of the presence service, as to whether to provide the requested access. In response to the determining to allow the access, access to the location attribute of the presence profile of the user of the device can be provided.

Therefore, upon the occurrence of a presence event such as a change of location, a presence profile of the principal can be updated to indicate a current location as a presence attribute of the presence profile. A change of location can be determined based on the presence service requesting a current location and determining the current location as described, for example, in the application entitled PAST PRESENCE HINTS referenced above, based on a notification from a device of the user provided periodically or upon detection of a change of location, based on a notification or request provided by another network resource periodically or upon detection of a change of location, etc. A notification of the change can be provided by the presence service to one or more subscribers or the location information can be available for answering requests. As noted, the location information provided as part of a notification to one or more subscribers or in response to a request or query can be subject to one or more policies and may be transformed by the policies.

Figure 5:
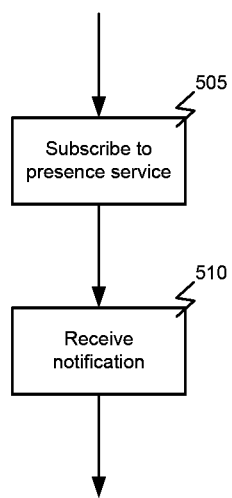
FIG. 5 is a flowchart illustrating a process for obtaining location information for a device according to one embodiment of the present invention.

FIG. 5 is a flowchart illustrating a process for obtaining location information for a device according to one embodiment of the present invention. More specifically, this example illustrates a process that may be performed by a subscriber of a presence service as described above to receive a notification indicating location information for a device maintained by a presence service. In this example, processing begins with subscribing 505 to a presence service. Once subscribed, the presence profile of a user of the device maintained by the presence service, including the location attribute indicating a location for the device, can be accessed 510. As noted above, accessing 510 the location attribute and/or the presence profile can comprise receiving a notification of a change in the location attribute. As noted above, the notification and/or the information provided thereby can be subject to application of one or more policies to determine which subscribers can receive the notification, the information provided in the notification (e.g. how is it transformed), etc.

Figure 6:
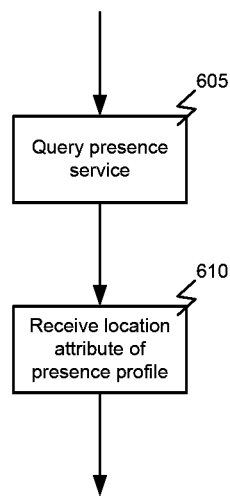
FIG. 6 is a flowchart illustrating a process for obtaining location information for a device according to an alternative embodiment of the present invention.

FIG. 6 is a flowchart illustrating a process for obtaining location information for a device according to an alternative embodiment of the present invention. More specifically, this example illustrates a process that may be performed by a user of a presence service as described above to obtain location information for a device maintained by a presence service by querying the presence service for such information. In this example, processing begins with the user querying 605 or requesting the location information from the presence service. In response to the query, the presence profile of a user of the device maintained by the presence service, including the location attribute indicating a location for the device, can be accessed and the 510 location information can be received 610 by the requesting or querying user in response to the query. Again, the query and the response thereto can be subject to application of one or more policies to determine which users can access the location information, the information provided in the response (e.g. how is it transformed), etc.

Based on the methods and systems described above, various types of services may be implemented that utilize the location information maintained by the presence service. For example, a Ring back tone (RBT) service based on the location information can be provided. The RBT service can provide one of a plurality of RBTs based on the location attribute of the presence profile of the principal. Thus, for example, one RBT can be used when the principal is at work and a different RBT can be used when the principal is at home. In another example, a proximity service based on the location information can be provided. The proximity service can provide a notification to the principal of proximity to another item or location of interest like a stores, business, promotion, or event close by or other people like buddies, friends, family, a boss, colleagues, etc. based on the location attribute of the presence profile of the principal. So for example, the principal can receive a notification is his current location is near a particular place of interest or is he is currently near another principal, e.g., a person identified on a buddy list. Each of these exemplary service will be described briefly with reference to FIGS. 7 and 8 respectively.

Figure 7:
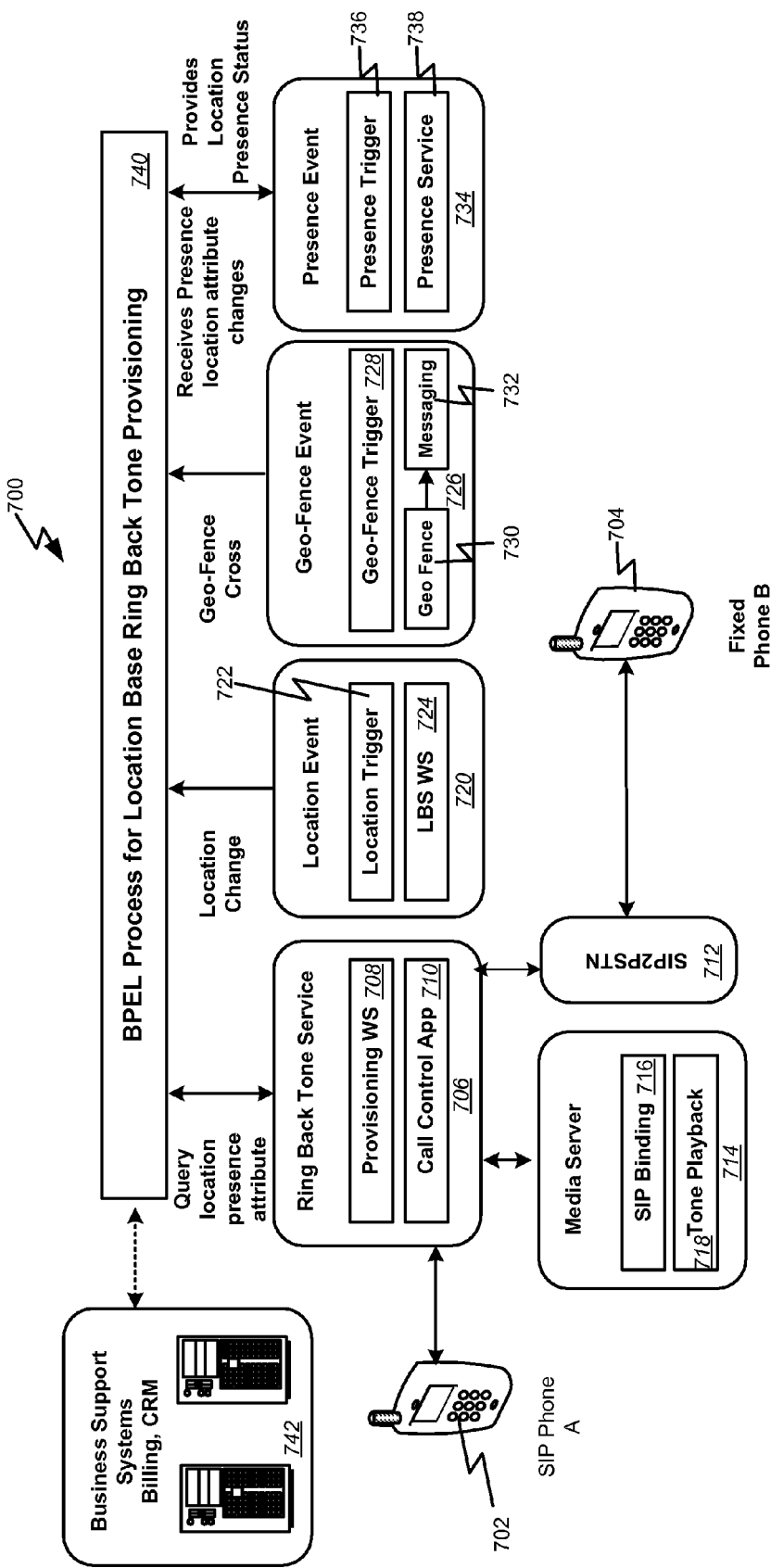
FIG. 7 is a block diagram illustrating an exemplary service utilizing location information according to one embodiment of the present invention.

FIG. 7 is a block diagram illustrating an exemplary service utilizing location information according to one embodiment of the present invention. More specifically, this example illustrates a system 700 for providing a RBT service based on location information maintained and provided as described above. In this example, the system 700 includes a Business Process Execution Language (BPEL) process 740 or other process for applying one or more rules upon events detected or triggered by other elements of the system 700. The other elements of the system can include, but are not limited to, a ring back tone service 706 comprising a provisioning web service 708 and a call control application 710, a location event module or service 722 comprising a location trigger module 722 and a Location Based Service (LBS) web service 724, a geo-fence service or module 726 comprising a geo-fence trigger module 728, a set of geo-fence definitions 730 and a messaging module 732, a presence service or module 734 comprising a presence trigger module 736 and a presence service 738, business support systems 742 such as billing etc., a media server 714 including a set of SIP bindings 716 and a tone playback module 718, and a SIP-to-PSTN module 712. So for example, via the geo-fence trigger module 728, the geo-fence service or module 726 can detect a principal going from one region to another region. The location attribute of the presence profile for that principal can be updated accordingly. Based on the current location of the principal, a different ring back tone can be used. So for example, at work the principal can have one RBT and at home the principal can have another RBT.

Generally speaking, when a user of phone A 702 calls a user of phone B 704, he/she can hear a ring back tone as a function of the presence and location of user B. That is, a RBT can be played as a function of location. As described above, location can be acquired either by getting notification that location has changed or by querying the presence when the RBT is to be selected. More specifically, this can be implemented, for example, over SIP with SIP soft clients or on a PSTN with a PSTN/SIP gateway such as SIP-to-PSTN module 712. Upon an incoming call being detected by the call control application 710 of the ring back tone service 706, an application can be notified through parlay call notification functions of the call control application 710. The user of phone A 702 can hear a RBT previously selected by the user of phone B 704 while a call to user B is initiated via $3^{rd}$ party call control of the call control application 710. When the user of phone B 704 answers, the user of phone A 702 is put in call with the user of phone B 704, again, via the call control functions of the call control application 710.

In one embodiment, a call sequence can begin when a location of phone A 702 is published in the presence service 738 as described above. The BPEL module, periodically or based on the occurrence of some event, can query the location via presence parlay X to get attributes of the presence including the location attribute as described above. In other cases, each location source, such as the location event module 720 upon a location trigger being detected by the location trigger module, the geo-fence event module 726 upon the crossing of a predefined geo-fence boundary 730 detected by the geo-fence trigger module 726, or other module, can directly publish to presence server 734 as described above. That is, to simplify the model, location fences can be defined. Then, instead of keeping track of all locations, the system can track if the user is in one region or another. In this example, the geo fencing is an example of a policy transformation as described above. That is, notification takes place when the principal jumps from one region to another (i.e. cross the fence). According to one embodiment, the RBT service 706 can subscribe to changes of the location attribute as described above and update its settings (via provisioning web service 708) that it uses to select a RBT, i.e., based on the current location of phone A 702.

This system 700 can be implemented in any of a variety of protocols and on any of a number different types of networks. One exemplary implementation can be on SIP. If implemented in SIP, when a user, e.g., the user of SIP phone 702, places a call, the call can be directed to a media server 714 or IVR/VoiceXML server (via third party multi party call control). The media server 714, in response, can play the ring back tone while another call is made to the target 704 via third party/multiparty call control. When the target 704 replies the caller is put in communications with the target 704 from media server 314 to target. The media server 714 can play a media (song) based on the location of the target. This can be accomplished by having the application that establishes the call between the caller 702 and the media server 714 also select the RBT to play based on the location of the target 704. This can be done by the querying the location as described above or maintaining the location information by having subscribed to the location/presence of the target also as described above. As noted, the system 700 can be implemented in other networks and on other protocols. For example, when implemented on a PSTN, a SIP/PSTN gateway or PBX can be used to achieve the same result by going from PSTN/IN to SIP for the media/RBT portion. Of course, in other implementations, this can be done entirely in a PSTN/IN network.

Figure 8:
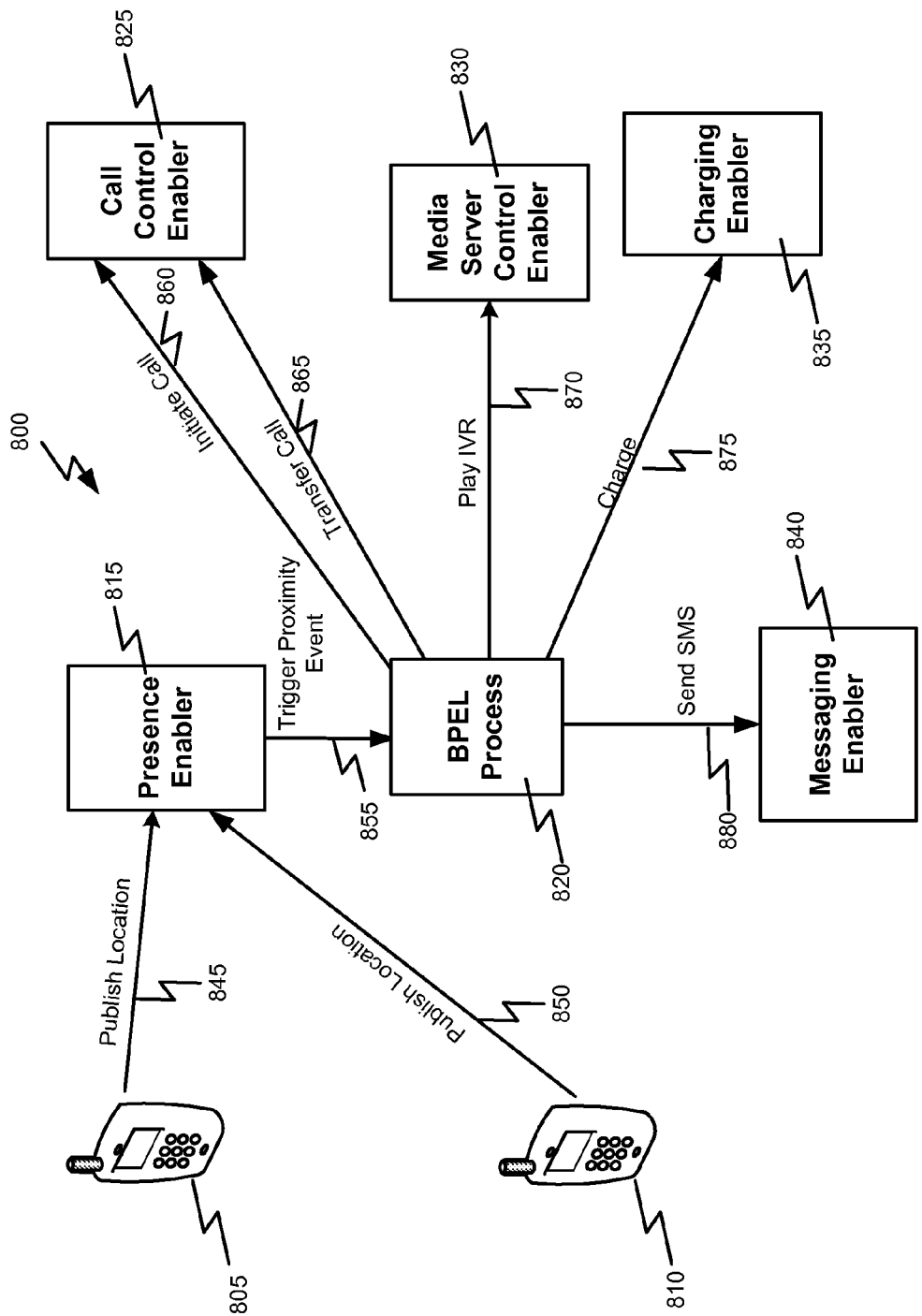
FIG. 8 is a block diagram illustrating another exemplary service utilizing location information according to another embodiment of the present invention.

FIG. 8 is a block diagram illustrating another exemplary service utilizing location information according to another embodiment of the present invention. This example illustrates a proximity service that can provide to a principal or user a notification, for example via SMS or other messaging or a call, of proximity to business, buddies, locations of interest, etc. The messages can include an option to take advantage of offers or to speak/contact buddies or other parties, meet them, etc. More specifically, this example illustrates a system 800 for providing a proximity service based on location information maintained and provided as described above. In this example, the system 800 includes a number of devices 805 and 810 and a presence enabler 815 or presence service as described above. The system 800 can also include a BPEL or other process 820 for applying one or more sets of rules to events and/or coordinating actions of the various other elements of the system 800. The system can also include a call control enabler 825 such as described, for example, in U.S. patent application Ser. No. 11/949,930 filed Dec. 4, 2007 by Maes and entitled "Call Control Enabler Abstracted from Underlying Network Technologies", the entire disclosure of which is incorporated herein by reference for all purposes, a media server control enabler 830 such as described, for example, in U.S. patent application Ser. No. 11/877,129 filed Oct. 23, 2007 by Maes and entitled "Network Agnostic Media Control Enabler", the entire disclosure of which is incorporated herein by reference for all purposes, a charging enabler 835 for applying appropriate charges to service usage, and a messaging enabler 840 for sending additional messages.

Generally speaking, in use, an application such as the BPEL process 820 can trigger on a change of location of one or more of the devices 805 and 810. For example, a workflow can be triggered by the notification of change that it subscribed to. Additionally or alternatively, an application subscribed to the notification of location change can determine the change and initiate a workflow. As a result, a message can be sent when the two devices 805 and 810 are close by or when one device is close to a particular location. More specifically, the devices 805 and 810 can publish 845 and 850 their location to the presence enabler 815 as described above. The presence enabler 815 can, upon determining that the devices 805 and 810 are nearby, can trigger a proximity event 855. In response to this proximity event, the BPEL process 820 can initiate a call 860 to one or more of the devices 805 and 810 via the call control enabler 825, request a message 870 to be played from the media server control enabler 830, e.g., "Joe is in your area, do you want to talk to him?", and/or connect 865 the devices 805 and 810 via the functions of the call control enabler 825. Additionally, the BPEL process 820 can request 875 the charging enabler 835 to apply appropriate charges for the service. In another embodiment, rather than initiating a call to one or more of the devices 805 and 810, when the presence enabler 815 triggers a proximity event, for example based on one of the devices 805 being close to a particular, predetermined location, the BPEL process 820 can request 880 the message enabler to send a message to that device 805, e.g., an SMS reading "Starbucks is two blocks north."

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of providing location information for a principal, the method comprising:
receiving at a presence server a presence event related to the principal, wherein the presence event relates to a location of the principal;
storing by the presence server the location of the principal as a location attribute of a presence profile of the principal;
applying by the presence server one or more of a plurality of policies, the plurality of policies including at least one policy for controlling access to the presence profile of the principal and at least one policy for filtering and transforming the location attribute based on the access, wherein the at least one policy for filtering and transforming the location attribute comprises a policy for controlling a specificity of the location attribute;
receiving a request to access the location attribute of the presence profile of the principal; and
in response to the request, providing access to the location attribute of the presence profile of the principal based on the at least one policy for controlling access to the presence profile of the principal and the at least one policy for filtering and transforming the location attribute based on the access.

2. The method of claim 1, further comprising providing access to the location attribute of the presence profile of the principal to one or more authorized users of a presence service.

3. The method of claim 2, wherein providing access to the location attribute of the presence profile of the principal to one or more authorized users of the presence service comprises providing a notification of a change of the location attribute to one or more subscribers to the presence profile.

4. The method of claim 3, wherein providing access to the location attribute of the presence profile of the principal to one or more subscribers to the presence profile is based on applying the policies of the presence service.

5. The method of claim 1, wherein the request to access the location attribute of the presence profile of the principal comprises a request to read the location attribute.

6. The method of claim 1, wherein the request to access the location attribute of the presence profile of the principal comprises a request to modify the location attribute.

7. The method of claim 1, wherein providing access to the location attribute of the presence profile of the principal to one or more subscribers to a presence profile is based on applying the policies of the presence service.

8. The method of claim 1, wherein receiving the presence event related to the principal comprises receiving the presence event from a device of the principal.

9. The method of claim 8, wherein the presence event indicates a location determined by the device.

10. The method of claim 1, wherein receiving the presence event related to the principal comprises receiving the presence event from a third-party to a presence service.

11. The method of claim 1, wherein receiving the presence event related to the principal comprises receiving the presence event from a user agent.

12. The method of claim 1, wherein receiving the presence event related to the principal comprises receiving the presence event from a Presence Network Agent.

13. The method of claim 10, wherein the presence event indicates a location determined by the third-party to the presence service.

14. The method of claim 13, wherein the third party comprises an application.

15. The method of claim 13, wherein the third party comprises a user agent.

16. The method of claim 13, wherein the third party comprises a network resource.

17. The method of claim 2, wherein providing access to the location attribute of the presence profile of the principal to one or more authorized users of a presence service comprises providing one or more services utilizing the location attribute.

18. The method of claim 17, wherein the one or more services comprise a Ringback Tone (RBT) service wherein the RBT service provides one of a plurality of RBTs based on the location attribute of the presence profile of the principal.

19. The method of claim 17, wherein the one or more services comprise a proximity service wherein the proximity service provides a notification to the principal of proximity to a location of interest based on the location attribute of the presence profile of the principal.

20. The method of claim 17, wherein the proximity service further provides a notification to a third party.

21. The method of claim 20, wherein the third party comprises an application.

22. The method of claim 20, wherein the third party comprises another principal.

23. The method of claim 19, wherein the location of interest comprises a current location of another user.

24. The method of claim 20, wherein the notification to the principal of proximity to the location of interest includes an option to contact the other user.

25. The method of claim 19, wherein the location of interest comprises a location of a business.

26. The method of claim 19, wherein the location of interest comprises a location of a promotion.

27. The method of claim 1, wherein the location attribute defines an exact location and wherein providing access to the location attribute of the presence profile of the principal based on the at least one policy for filtering and transforming the location attribute comprises allowing access to the exact location.

28. The method of claim 1, wherein the location attribute defines an exact location and wherein providing access to the location attribute of the presence profile of the principal based on the at least one policy for filtering and transforming the location attribute comprises transforming the exact location to a coarse location and allowing access to the coarse location.

29. The method of claim 1, wherein the location attribute defines an exact location and wherein providing access to the location attribute of the presence profile of the principal based on the at least one policy for filtering and transforming the location attribute comprises transforming the exact location to a city location allowing access to the city location.

30. The method of claim 1, wherein the location attribute defines an exact location and wherein providing access to the location attribute of the presence profile of the principal based on the at least one policy for filtering and transforming the location attribute comprises transforming the exact location to a region location and allowing access to the region location.

31. A system comprising:
a communications network;
a user agent communicatively coupled with the communications network;
a presence server communicatively coupled with the communications network and adapted to provide a presence service, wherein the presence service receives a presence event related to the user agent via the communications network, wherein the presence event relates to a location of the principal, store the location of the principal as a location attribute of a presence profile of the principal, and apply one or more of a plurality of policies, the plurality of policies including at least one policy for controlling access to the presence profile of the principal and at least one policy for filtering and transforming the location attribute based on the access, wherein the at least one policy for filtering and transforming the location attribute comprises a policy for controlling a specificity of the location attribute;
receiving a request to access the location attribute of the presence profile of the principal; and
in response to the request, providing access to the location attribute of the presence profile of the principal based on the at least one policy for controlling access to the presence profile of the principal and the at least one policy for filtering and transforming the location attribute based on the access.

32. The system of claim 31, wherein the presence service is adapted to provide access to the location attribute of the presence profile of the principal to one or more authorized users of a presence service.

33. The system of claim 32, wherein providing access to the location attribute of the presence profile of the principal to one or more authorized users of the presence service comprises providing a notification of a change of the location attribute to one or more subscribers to the presence profile.

34. The system of claim 33, wherein providing access to the location attribute of the presence profile of the principal to one or more subscribers to the presence profile is based on applying the policies of the presence service.

35. The system of claim 31, wherein the request to access the location attribute of the presence profile of the principal comprises a request to read the location attribute.

36. The system of claim 31, wherein the request to access the location attribute of the presence profile of the principal comprises a request to modify the location attribute.

37. The system of claim 31, wherein providing access to the location attribute of the presence profile of the principal to one or more subscribers to a presence service is based on applying the policies of the presence service.

38. The system of claim 31, wherein receiving the presence event related to the principal comprises receiving the presence event from a device of the principal.

39. The system of claim 38, wherein the presence event indicates a location determined by the device.

40. The system of claim 31, wherein receiving the presence event related to the principal comprises receiving the presence event from a third-party to a presence service.

41. The system of claim 31, wherein receiving the presence event related to the principal comprises receiving the presence event from a user agent.

42. The system of claim 31, wherein receiving the presence event related to the principal comprises receiving the presence event from a presence network agent.

43. The system of claim 40, wherein the presence event indicates a location determined by the third-party to the presence service.

44. The system of claim 43, wherein the third party comprises an application.

45. The system of claim 43, wherein the third party comprises a user agent.

46. The system of claim 43, wherein the third party comprises a network resource.

47. The system of claim 32, wherein providing access to the location attribute of the presence profile of the principal to one or more authorized users of a presence service comprises providing one or more services utilizing the location attribute.

48. The system of claim 47, wherein the one or more services comprise a Ringback Tone (RBT) service wherein the RBT service provides one of a plurality of RBTs based on the location attribute of the presence profile of the principal.

49. The system of claim 47, wherein the one or more services comprise a proximity service wherein the proximity service provides a notification to the principal of proximity to a location of interest based on the location attribute of the presence profile of the principal.

50. The system of claim 49, wherein the location of interest comprises a current location of another user.

51. The system of claim 50, wherein the notification to the principal of proximity to the location of interest includes an option to contact the other user.

52. The system of claim 49, wherein the location of interest comprises a location of a business.

53. The system of claim 49, wherein the location of interest comprises a location of a promotion.

* * * * *

UNITED STATES PATENT AND TRADEMARK OFFICE
CERTIFICATE OF CORRECTION

PATENT NO. : 8,675,852 B2
APPLICATION NO. : 12/014387
DATED : March 18, 2014
INVENTOR(S) : Maes Page 1 of 1

It is certified that error appears in the above-identified patent and that said Letters Patent is hereby corrected as shown below:

On title page 5, column 2, under Other Publications, line 1, delete ""Parley"," and insert -- "Parlay", --, therefor.

On title page 6, column 2, under Other Publications, line 27, delete "32" and insert -- 3 --, therefor.

In the Specification

In column 8, line 43, delete "(e.g." and insert -- (e.g., --, therefor.

In column 11, line 7, delete "enbaler," and insert -- enabler, --, therefor.

Signed and Sealed this
Eighth Day of July, 2014

Michelle K. Lee
*Deputy Director of the United States Patent and Trademark Office*